United States Patent [19]
Evans et al.

[11] Patent Number: 6,031,048
[45] Date of Patent: *Feb. 29, 2000

[54] POLYETHER AMINE MODIFICATION OF POLYPROPYLENE

[75] Inventors: Randall Keith Evans, Cypress; Richard J.G. Dominguez; Richard J. Clark, both of Austin, all of Tex.

[73] Assignee: Huntsman Petrochemical Corporation, Austin, Tex.

[*] Notice: This patent is subject to a terminal disclaimer.

[21] Appl. No.: 08/679,070

[22] Filed: Jul. 12, 1996

Related U.S. Application Data

[63] Continuation-in-part of application No. 08/499,521, Jul. 7, 1995, Pat. No. 5,783,630, which is a continuation-in-part of application No. 08/222,508, Apr. 4, 1994, abandoned, which is a continuation of application No. 08/090,675, Jul. 13, 1993, abandoned.

[51] Int. Cl.[7] .................................................. C08L 51/06
[52] U.S. Cl. .............................. 525/73; 525/63; 525/69; 525/74; 525/78; 525/80; 525/379; 525/381; 525/382; 525/193; 525/194; 524/504
[58] Field of Search ............................... 525/74, 78, 80, 525/374, 379, 73, 63, 69, 77, 193, 194, 381, 382; 524/504

[56] References Cited

U.S. PATENT DOCUMENTS

| | | | |
|---|---|---|---|
| 3,320,226 | 5/1967 | Cappuccio et al. | 525/180 |
| 3,654,370 | 4/1972 | Yeakey | 564/480 |
| 4,039,461 | 8/1977 | Hankins et al. | 252/51.5 A |
| 4,137,185 | 1/1979 | Gardiner et al. | 252/33 |
| 4,179,164 | 12/1979 | Lausberg et al. | 525/179 |
| 4,505,834 | 3/1985 | Papay et al. | 252/51.5 A |
| 4,520,171 | 5/1985 | Diveley et al. | 525/279 |
| 4,632,769 | 12/1986 | Gutierrez et al. | 252/48.6 |
| 4,636,436 | 1/1987 | Clementini et al. | 428/364 |
| 4,678,834 | 7/1987 | Boivin et al. | 525/74 |
| 4,710,540 | 12/1987 | McAlpin et al. | 525/101 |
| 4,753,998 | 6/1988 | Shyu et al. | 525/259 |
| 4,795,782 | 1/1989 | Lutz et al. | 525/66 |
| 4,822,688 | 4/1989 | Nogues | 525/66 |
| 4,857,595 | 8/1989 | Kazmierzak et al. | 525/375 |
| 4,861,812 | 8/1989 | McAlpin | 524/3 |
| 4,902,749 | 2/1990 | Akkapeddi et al. | 525/66 |
| 4,952,631 | 8/1990 | McAlpin et al. | 525/101 |
| 4,981,896 | 1/1991 | Okada et al. | 524/413 |
| 4,994,503 | 2/1991 | Harris et al. | 525/459 |
| 5,006,601 | 4/1991 | Lutz et al. | 525/66 |
| 5,010,119 | 4/1991 | McElrath, Jr. et al. | 523/205 |
| 5,073,600 | 12/1991 | Gorman et al. | 525/264 |
| 5,115,018 | 5/1992 | Akkapeddi et al. | 525/64 |
| 5,208,081 | 5/1993 | Gubitz et al. | 428/31 |
| 5,210,134 | 5/1993 | Akkapeddi et al. | 525/64 |
| 5,225,483 | 7/1993 | Datta et al. | 525/74 |
| 5,244,971 | 9/1993 | Jean-Marc | 525/64 |
| 5,346,951 | 9/1994 | Suwada | 525/64 |
| 5,364,909 | 11/1994 | Guo et al. | 525/69 |
| 5,369,170 | 11/1994 | Weinkauf | 525/64 |
| 5,373,048 | 12/1994 | Witzeman et al. | 524/458 |
| 5,384,375 | 1/1995 | Roberts | 525/327.6 |
| 5,393,824 | 2/1995 | Roberts et al. | 524/531 |

FOREIGN PATENT DOCUMENTS

| | | |
|---|---|---|
| 1184554 | 3/1985 | Canada . |
| 0061889 | 10/1982 | European Pat. Off. . |
| 0367832A1 | 5/1990 | European Pat. Off. . |
| 46-003838 | 1/1971 | Japan . |
| 60195120 | 3/1984 | Japan . |
| 7-053812 | 2/1995 | Japan . |
| 2156364 | 10/1985 | United Kingdom . |
| WO93/24938 | 12/1993 | WIPO . |

OTHER PUBLICATIONS

Dagli et al., "Process requirements of the reactive compatibilization of Nylon 6/Polypropylene blends," Polymer Processing Institute at Stevens Institute of Technology, Hoboken, NJ.
Derwent Abstract of JP 2237943 (Sep. 1990).
Callais & Kazmierzak, "The Maleic Grafting of Polypropylene With Organic Peroxides", *COMPALLOY '90*, pp. 361–369, (1990).

*Primary Examiner*—Mark L. Warzel
*Attorney, Agent, or Firm*—Jones, O'Keefe, Egan & Peterman

[57] ABSTRACT

A compound comprising a blend of polypropylene with the reaction of a functionalized polypropylene and polyether amine in which the polyetheramine is grafted into the functionalized polypropylene in a customary mixing apparatus is disclosed. The blend may include an elastomer such as EP rubber and/or a filler such as glass. A process for producing the reaction product of the functionalized polypropylene and the polyether amine by melting with polypropylene in a customary mixing apparatus is also disclosed. Blends of the present invention are advantageously useful to prepare paintable automotive body parts.

73 Claims, No Drawings

6,031,048

POLYETHER AMINE MODIFICATION OF POLYPROPYLENE

This is a continuation-in-part of Ser. No. 08/499,521, filed Jul. 7, 1995, U.S. Pat. No. 5,783,630, which is a continuation-in-part application of Ser. No. 08/222,508, filed Apr. 4, 1994, now abandoned, which is a continuation application of Ser. No. 08/090,675, filed Jul. 13, 1993, now abandoned.

BACKGROUND OF THE INVENTION

This invention relates to a novel olefin polymer composed of the reaction of a functionalized polypropylene and a polyetheramine. This invention also relates to thermoplastic resin blends containing the novel olefin polymer and polypropylene.

The in situ formation of compatibilizers for polyblends is rapidly gaining popularity. In the last few years, more and more cases have been reported where advantage is taken of the presence of reactive groups to form a graft or a block or a random copolymer, which could act as a compatibilizer for a mixture of two or more polymers. The prior art, *Process Requirements of the Reactive Compatibilization of Nylon 6/Polypropylene Blends* by S. S. Dagli, M. Xanthos and J. A. Biensenberger: Polymer Processing Institute at Stevens Institute of Technology, Hoboken, N.J. 07030 reveals an acrylic acid grafted modified polypropylene used with a blend of nylon-6 and polypropylene.

Thermoplastic resin compositions containing polypropylene are well known in the art (e.g. U.S. Pat. No. 5,208,081). U.S. Pat. No. 5,179,164 describes a polypropylene/polyamide composition suitable for producing moldings. The patent describes an ethylene copolymer useful as an adhesion promoter. Moreover, the patent indicates that maleic acid is a suitable monomer for preparing the ethylene copolymer.

In addition, maleated polypropylene is commercially available.

European patent application 0 367 832 discloses a resin composition containing an olefinic polymer having acid anhydride groups. As in U.S. Pat. No. 5,179,164, the novel compound is blended with a polyamide.

Japanese patent 46003838 reveals a maleic anhydride modified polypropylene composition containing triethylamine and polyethylene glycol nonylphenyl ether. Japanese patent 60195120 reveals a molding containing polyethylene, maleic anhydride-grafted polyethylene, and diethylenetriamine.

However, the instant invention uses the maleic anhydride in conjunction with polyetheramines which produce unexpected improvements in resin properties.

SUMMARY OF THE INVENTION

This invention is a compound comprising a blend of polypropylene ("PP") with the reaction product of a functionalized polypropylene and polyetheramine in which the polyether amine is grafted onto the functionalized polypropylene in a customary mixing apparatus. By grafted it is meant that the amine functionality of the polyetheramine reacts with the anhydride component of the functionalized polypropylene to form a reaction product, for instance, a primary amine will react with a maleic anhydride to form an imide. This invention is also a process for producing the reaction product of the functionalized polypropylene and the polyether amine by melting with polypropylene in a customary mixing apparatus. In this regard, the compound blend of this invention may be prepared by reactive extrusion by feeding a polyetheramine, a functionalized polypropylene and polypropylene into an extruder at temperatures such that the polyetheramine reacts with the functionalized polypropylene to form a reaction product containing, for example, an imide group.

In another respect, this invention is a composition comprising polypropylene, a crosslinked thermoplastic polyolefin vulcanizate, and the reaction product of a functionalized polypropylene and a polyether amine.

The compositions of the present invention are useful for preparing molded automotive body parts, including directly paintable thermoplastic polyolefins ("TPO") based, and thermoplastic polyolefin vulcanizates ("TPV") based, automotive body parts.

It is also contemplated that the compositions are useful for making molded parts that contain filler such as glass. It is yet further contemplated that the compositions of the present invention may be useful in the preparation of films, including packaging films, to eliminate tie layers and to improve printability and barrier properties; fibers including dyable and non-woven PP fibers; and in packaging materials for electronics components such as semiconductor chips, wherein the packaging materials may provide electrostatic dissipation which would thereby protect the chips from damage. It is yet further contemplated that the composition of the present invention may be useful to improve the barrier properties for polyethylene and to modify polyethylene as a tie layer in multilayer films. It is further contemplated that the composition of the present invention may be useful as an additive as polypropylene based reinforcement fibers for concrete.

DESCRIPTION OF THE PREFERRED EMBODIMENT

The blend of polypropylene with the reaction product of maleated polypropylene and polyether amine shows improved paintability, improved impact resistance, and excellent mold flowability over blends of polypropylene and maleated polypropylene.

Plastics are increasingly being employed in the production of motor vehicles. Impact-modified PP has proved to be particularly suitable for applications such as bumpers, spoilers, fenders, side bump strips and the like. Therefore, a thermoplastic resin blend having the improved properties of the instant invention has significant potential commercial usefulness.

These resin compositions, according to the present invention, are useful as engineering plastics which are materials for structural members in the fields of transport machines (automobiles, ships and the like), apparatus, tools, electronic appliances, electric appliances, sporting goods, leisure goods and the like; and for connectors, tubes and the like.

Suitable polypropylenes are known from polymer chemistry, are described for example in Kunststoff-Handbuch, volume IV, Polyolefins, edited by R. Vieweg, A. Schley and A. Schwarz. Carol Hanser Verlag, Munich, 1969, and are commercially available, so that no details need be given.

Functionalized PP is PP onto which a monomer has been grafted. The usual method of such grafting is by free radical reaction. In the practice of this invention, the maleated polypropylene is not a copolymer of maleic anhydride or equivalent thereof, and propylene, such that the maleic anhydride moiety is predominantly in the backbone of the copolymer. Suitable monomers for preparing functionalized polypropylene are, for example, olefinically unsaturated monocarboxylic acids of less than 12 carbon atoms, e.g., acrylic acid or methacrylic acid, and the corresponding tert-butyl esters, e.g., tert-butyl (meth)acrylate, olefinically unsaturated dicarboxylic acids of less than 12 carbon atoms, e.g., fumaric acid, maleic acid, and itaconic acid and the corresponding mono-and/or di-tert-butyl esters, e.g., mono- or di-tert-butyl fumarate and mono- or di-tert-butyl maleate, olefinically unsaturated dicarboxylic anhydrides of less than 12 carbon atoms, e.g., maleic anhydride, sulfo- or sulfonyl-containing olefinically unsaturated monomers of less than 12 carbon atoms, e.g., p-styrenesulfonic acid, 2-(meth) acrylamide-2-methylpropenesulfonic acid or 2-sulfonyl (meth)acrylate, oxazolinyl-containing olefinically unsaturated monomers of less than 12 carbon atoms, e.g., vinyloxazolines and vinyloxazoline derivatives, and epoxy-containing olefinically unsaturated monomers of less than 12 carbon atoms, e.g., glycidyl (meth)acrylate or allyl glycidyl ether. The most preferred monomer for preparing functionalized polypropylene is maleic anhydride.

The functionalized polypropylene used in the practice of this invention may have a wide variety of number average molecular weights. When the functionalized polypropylene is used to make paintable articles, such as automotive body parts, the functionalized polypropylene preferably has a number average molecular weight greater than about 3,000 and preferably less than about 20,000, more preferably less than about 10,000. A representative example of a maleated polypropylene that is currently commercially available is under the name EPOLENE E-43, available from Eastman Chemical. Such relatively low molecular weight functionalized polypropylenes, when reacted with polyetheramines in accordance with the practice of this invention, appears to render the resulting extruded compositions more readily paintable. In other applications wherein the functionalized polypropylene is employed, such as when a glass filler is added to increase stiffness and strength, a higher average number molecular weight greater than about 20,000 may be employed.

Suitable anhydride functionalized polypropylene include the following structures:

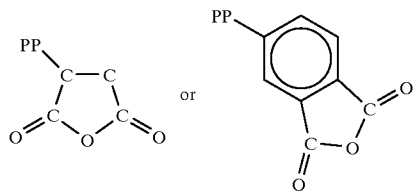

wherein PP is polypropylene. In these structures, it should be appreciated that the polypropylene can be bonded to one or two monomers when the polypropylene is linear, while more than two monomers might be included when the propylene is branched. Typically, one or two monomers are present.

Suitable polyetheramines include monamines, diamines and triamines, having a molecular weight of from about 150 to about 12,000. Preferred polyetheramines have a molecular weight of from about 1,000 to about 3,000. Suitable monamines include JEFFAMINE M-1000, JEFFAMINE M-2070, and JEFFAMINE M-2005. Suitable diamines include JEFFAMINE ED-6000, JEFFAMINE ED4000, JEFFAMINE ED-2001 including XTJ-502 and TXJ-418, JEFFAMINE D-2000, JEFFAMINE D4000, JEFFAMINE ED-900, JEFFAMINE ED-600, and JEFFAMINE D400. Suitable triamines include JEFFAMINE ET-3000, JEFFAMINE T-3000 and JEFFAMINE T-5000. Preferred polyetheramines include JEFFAMINE M-2070 and JEFFAMINE ED-2001. See the glossary for structures of these polyetheramines. More preferred polyetheramines of the present invention have a molecular weight in the range from about 1500 to about 2000. One especially preferred polyetheramine is a polyether monoamine which contains from about 36 to about 44 ethylene oxide units and from 1 to about 6 propylene oxide units. In one embodiment, such polyether monoamines have a molecular weight of about 2000 to about 2200. In another embodiment, the polyether monoamine contains about 40 to about 43 ethylene oxide units and from about 2.4 to about 3 propylene oxide units. Certain polyether monoamines are of formula:

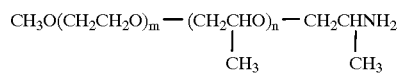

wherein m is about 36 to about 44 and wherein n is about 1 to about 6, including polyether monoamines wherein m is about 40 to about 43 and n is about 2.4 to about 3, as well as compounds of the formula having a molecular weight of about 2000 to about 2200.

In the practice of this invention, monoamines and diamines are preferred. Suitable polyether blocks for the polyetheramine include polyethylene glycol, polypropylene glycol, copolymers of polyethylene glycol and polypropylene glycol, poly(1,2-butylene glycol), and poly (tetramethylene glycol). The glycols can be aminated using well known methods to produce the polyetheramines. Generally, the glycols are prepared from ethylene oxide, propylene oxide or combination thereof using well known methods such as by a methoxy or hydroxy initiated reaction. When both ethylene oxide and propylene oxide are used, the oxides can be reacted simultaneously when a random polyether is desired, or reacted sequentially when a block polyether is desired.

In one embodiment of the present invention, the polyetheramines are prepared from ethylene oxide, propylene oxide or combinations thereof. Generally, when the polyetheramine is prepared from ethylene oxide, propylene oxide or combinations thereof, the amount of ethylene oxide on a molar basis is greater than about 50 percent of the polyetheramine, preferably greater than about 75 percent and more preferably greater than about 90 percent. In one embodiment of this invention, polyols and amines including polyalkylene polyamines and alkanol amines or any amine that is not a polyetheramine as disclosed herein may be absent from the composition. Similarly, functional groups other than ether linkages and amine groups may be absent from the polyetheramine. The polyether amines used in the practice of this invention can be prepared using well known amination techniques such as described in U.S. Pat. No. 3,654,370; U.S. Pat. No. 4,152,353; U.S. Pat. No. 4,618,717; U.S. Pat. No. 4,766,245; U.S. Pat. No. 4,960,942; U.S. Pat. No. 4,973,761; U.S. Pat. No. 5,003,107; U.S. Pat. No. 5,352,835; U.S. Pat. No. 5,422,042; and U.S. Pat. No. 5,457,147. Generally, the polyether amines are made by aminating a polyol, such as a polyether polyol with ammonia in the presence of a catalyst such as a nickel containing catalyst such as a Ni/Cu/Cr catalyst.

The mixing of the functionalized PP and polyetheramine and optionally also PP may be carried out in a customary mixing apparatus including batch mixers, continuous mixers, kneaders, and extruders. For most applications, the preferred mixing apparatus is an extruder.

Besides the PP/functionalized-PP/polyetheramine structural components according to the invention, the resin composition may, to improve the impact strength, contain impact modifiers, advantageously impact-modifying elastomers. Impact-modifying elastomers for the instant invention are known to a skilled worker. Examples are rubbers based on ethylene, propylene, butadiene, and acrylates, e.g. methacrylates, or mixtures thereof. Other examples include EP and EPDM rubbers, with EP rubber (ethylene propylene rubber) being preferred in applications where automotive body parts are being prepared. A representative example of a currently commercially available EP rubber is sold under the name VISTALON 878 by Exxon Chemical.

Suitable impact-modifying elastomers are described for example in Methoden der organischen Chemie (Houben-Weyl), volume XIV/1, Makromolekulare Chemie (Georg-Thieme-Verlag, Stuttgart, 1961), pages 390 to 406, and in the monograph by C. B. Bucknal, Toughened Plastics (Applied Publishers, London, 1977).

A composition containing polypropylene and elastomers, such as EP rubber, is commonly referred to as a "TPO," which stands for thermoplastic polyolefin. TPO's are commonly used in the manufacture of molded automotive body parts, such as bumper fascias. Such molded parts may also contain other components such as fillers, as described hereinbelow. TPO-based compositions can be prepared in the same manner as for non-elastomer-containing compositions. TPO's are commonly sold in compounded or reactor grades. Representative examples of TPO which are currently available commercially are described below in the paragraphs preceding Examples 18–27.

A composition containing polypropylene and vulcanized elastomers (vulcanized rubber), including thermoplastic polyolefin vulcanizates, is commonly referred to as a "TPV." TPV's are commonly used in the manufacture of molded automotive body parts, such as grips and handles. These molded parts may contain other components such as fillers, as described below. TPV-based compositions may be prepared in the same manner as for non-elastomer-containing compositions. A representative example of a commercially available TPV is described below with reference to Examples 28 and 29.

It is contemplated that the polyetheramine and functionalized polypropylene, and optionally a small amount of PP, TPV or TPO, can be reacted to form a reaction product concentrate and, later, the reaction product concentrate can be blended with polypropylene or TPO or TPV. In this aspect of the invention, the polyetheramine comprises from about 10 to about 50 weight percent of the concentrate. When the reaction product of polyether amine and maleated PP is prepared neat, the reaction product can be blended or compounded with polypropylene or TPO and any other components of the desired composition to the desired levels using a mixing apparatus such as an extruder. It should be understood that PP may be commonly used to dilute the reaction. Depending on the type of mixer, the reaction product, polypropylene and any other components can be thoroughly mixed as solids prior to introducing the admixture in the mixing apparatus. Alternatively, mixers are available which will mix the components during operation. In either case, during operation of the mixer, the components are heated to melt the solids, with the melted components being thereafter mixed to form the final composition.

In addition to the structural components of PP, functionalized-PP, and polyetheramine and any impact modifier contained in a resin composition according to the instant invention, the resin may also contain reinforcing agents and/or additives. The reinforcing agents used may be reinforcing fillers, for example, carbon or carbon fibers; clay, chalk, talc, and mica to control shrinkage and control coefficient of thermal expansion; glass (beads, fibers or mats such as of woven fibers) to increase stiffness. Further, the fillers may be finished with adhesion promoters and/or sizing agents. In addition, phosphite or hindered phenol or both can be added as a stabilizer (as a free radical scavenger).

When compositions include glass beads or fibers, the composition can contain up to about 40% glass filler if highly stiff compositions are desired. When compositions include glass mats, the composition can contain up to about 80% glass. More typically, from about 2% to about 10% glass filler in the composition is employed. Advantageously, the compositions of the present invention that contain glass filler generally are substantially free of voids that typically develop in compositions containing polypropylene and glass. While not wishing to be bound by theory, it is believed that the reaction product of polyether amine and maleated polypropylene serves to "wet" the glass to thereby make the glass and polypropylene more combinable (more miscible). In this aspect of the invention, it is preferred to employ maleated polypropylene having an average molecular weight of about 40,000 to about 60,000, as is described hereinabove. Generally, glass filler and polypropylene are not miscible, and their combination commonly leads to voids in the resulting compositions. The relatively higher molecular weight materials "wet" the glass to make the glass filler particles and polypropylene more combinable to thereby decrease the amount of voids in the resulting compositions.

The preferred functionalized polypropylene is a maleated polypropylene having the following structure:

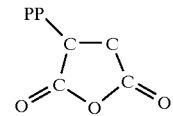

wherein PP is polypropylene.

The preferred polyetheramines are monoamines and diamines. The preferred monoamines as well as the preferred triamines have a molecular weight of from about 200 to about 4000. The preferred diamines have a molecular weight of from about 148 to about 6000. More preferred monoamines and diamines have a molecular weight of from about 1,000 to about 3,000.

In one embodiment, the preferred polyetheramine is a polyether monoamine which contains from about 36 to about 44 ethylene oxide units and from 1 to about 6 propylene oxide units. In one embodiment, such polyether monoamines have a molecular weight of from about 2000 to about 2200. In a particular embodiment, the polyether monoamine contains from about 40 to about 44 ethylene oxide units and about 2.4 to about 3 propylene oxide units. Such polyether monoamines may have the formula:

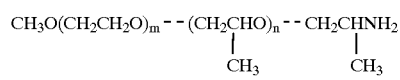

wherein m is from about 36 to about 44, and wherein n is about 1 to about 6. Huntsman Corporation refers to one such polyether monoamine as XTJ418.

The preferred reaction product between the preferred functionalized polypropylene, maleated polypropylene, and the preferred polyetheramine has the following formula:

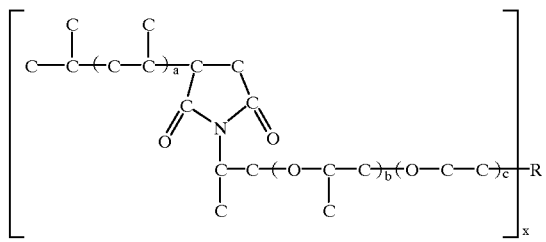

wherein a is from about 5 to 50,000, for b:c from about 0:100 to 100:0, x is from about 1 to 3, and R is hydrogen or an alkyl moiety having a functionality of x (i.e., if x is 2, R is a divalent), the alkyl radical having 1 to 10 carbon atoms.

Suitable thermoplastic resin compositions may contain from about 66 to about 80 wt % TPO or TPV, from about 5 to about 30 wt % maleated PP and from about 2 to about 10 wt % polyetheramine. When the compositions include elastomers, such as in TPO-based compositions used to make automotive body parts, or TPV based compositions, the compositions generally comprise from about 5 to about 40 wt % maleated TPO or TPV, from about 2 to about 10 wt % polyetheramine and from about 50 to about 93 wt % PP, such percentages based on the weights of these components of the composition. Preferred compositions that include elastomers, or which are TPV-based, comprise about 15 to about 30 wt % maleated PP, from about 2 to about 8 wt % polyetheramine and from about 62 to about 83 wt % TPO or TPV.

The preferred customary mixing apparatus is an extruder in which the polyetheramine is grafted onto the maleated polypropylene at from about 175 to 300° C. in the course of a residence time of from about 25 to 300 seconds. For typical compositions of this invention, degradation begins to occur above this temperature range and below this range the compositions generally do not melt. Polypropylene is a non-reactive component of the mixing blend. The preferred temperature range is from about 190 to 260° C. Excess moisture in the blended composition may cause surface blemishes upon molding, but the moisture can be removed by the normal drying processes, including the use of heated, dry air.

Molded articles prepared from compositions according to the present invention are generally directly paintable. Representative examples of paints commonly employed for this purpose include urethane-based and melamine-based paints. Such paints may be applied using conventional techniques. Advantageously, compositions of the present invention may be painted directly without solvent borne chlorinated polyethylene pretreatment and optionally without primer, though a primer may be used.

In the examples, continuous compounding was carried out in a Werner & Pfleiderer 30 mm twin screw extruder (ZSK30), having a nine barrel configuration, three kneading zones and one vent section, in which the feed sequence was a combined feed in which all the components fed at the same location (hopper of the extruder).

The following examples which illustrate the nature of the instant invention are not intended to be limitative. In the examples, a stoichiometric excess of maleic functionality on the maleated polypropylene is used relative to the amount of amine functionality on the polyetheramine.

EXAMPLES 1–6

Blends of PP, maleated PP (MAL-PP), and JEFFAMINE M2070 produced in an extruder exhibit characteristics in percent compositions as shown in Table 1 in which the remaining percent is PP:

TABLE 1

| Example | 1 | 2 | 3 | 4 | 5 | 6 |
|---|---|---|---|---|---|---|
| % MAL-PP | | 20 | | | 30 | |
| % M2070 | 0 | 2 | 4 | 0 | 2 | 4 |
| FM, psi | 284K | 255K | 226K | 289K | 256K | 201K |
| StY, psi | 8660 | 7980 | 7030 | 8750 | 7830 | 6170 |
| TE, % | 8 | 16 | 10 | 4 | 13 | 5 |
| TSt, psi | 4990 | 4770 | 4280 | 5000 | 4630 | 3720 |
| NI, ft lb/in | 0.161 | 0.220 | 0.386 | 0.123 | 0.139 | 0.220 |
| UnI, ft lb/in | 12 | 14 | 10 | 10 | 14 | 5 | where:
FM—flexural modulus
StY—stress at yield
TE—Tensile elongation
TSt—tensile strength
NI—notched izod impact
UnI—unnotched izod impact

EXAMPLES 7–10

Table 2 reveals the effects of JEFFAMINE M2070 (M) as compared to JEFFAMINE ED2001 (ED) in which either is blended with from about 76 to 78 wt % of PP, and from about 20 wt % of MAL-PP in an extruder.

TABLE 2

| Example | 7 | 8 | 9 | 10 |
|---|---|---|---|---|
| J. Type | M | ED | M | ED |
| % JEFF. | | 2 | | 4 |
| FM, psi | 255K | 246K | 226K | 230K |
| StY, psi | 7980 | 7730 | 7030 | 7140 |
| TE, % | 16 | 10 | 10 | 16 |
| TSt, psi | 4770 | 4560 | 4280 | 4420 |
| NI, ftlb/in | 14 | 15 | 10 | 18 |
| UnI, ftlb/in | 14 | 15 | 10 | 18 | where:
FM - flexural modulus
StY - stress at yield
TE - Tensile elongation
TSt - tensile strength
NI - notched izod impact
UnI - unnotched izod impact.

EXAMPLES 11–17

Table 3 reveals the percent paint adhesion of various compositions of PP, maleated PP, and the JEFFAMINES indicated relative to an unmodified PP control sample wherein the blends were produced in an extruder.

TABLE 3

| Example | PP | MAL-PP | % J. Type | Paint Adhesion | Control |
|---|---|---|---|---|---|
| 11 | 76% | 20% | 4% JEFFAMINE M1000 | 62% | 2% |
| 12 | 76% | 20% | 4% JEFFAMINE ED-6000 | 28% | 4% |
| 13 | 74% | 20% | 6% JEFFAMINE ED-6000 | 46% | 4% |
| 14 | 74% | 20% | 6% JEFFAMINE ED-4000 | 40% | 4% |
| 15 | 74% | 20% | 6% JEFFAMINE-2070 | 77% | 21% |
| 16 | 72% | 20% | 8% JEFFAMINE-2070 | 40% | 21% |
| 17 | 72% | 20% | 8% JEFFAMINE-2001 | 68% | 21% |

In the following Examples 18–27, there are shown modified TPO-based (thermoplastic olefin-based) compositions including polyether amines of the present invention (in Tables 18A, 19A, 20A, 21A, 22A, 23A, 24A, 25A, 26A, and 27A), the physical properties of the compositions (in Tables 18B, 19B, 20B, 21B, 22B, 23B, 24B, 25B, 26B, and 27B) and the paint adhesion of the compositions (in Tables 18C, 19C, 20C, 21C, 22C, 23C, 24C, 25C, 26C, and 27C). Examples 28–29 show TPV-based compositions. In the Tables shown in Examples 18-29, the following phrases have the indicated meanings:

"HIMONT CA53A" is a reactor grade TPO containing polypropylene ("PP") and ethylene propylene rubber ("EP rubber") obtained from Himont, which may be described as having medium melt flow.

"Phenol" is ETHANOX 330 which is a hindered phenol stabilizer obtained from Albemarle.

"EPOLENE E43" is a maleated PP obtained from Eastman Chemical, having about 4 wt % maleation as determined from proton nmr.

"HIMONT LB150161" is a reactor grade TPO having a high melt flow.

"AMOCO 1016" is a PP having a melt flow rate at 230° C. of about 5 g/min. as indicated by the supplier, Amoco Chemical.

"DEXFLEX D-161" is a compounded TPO of PP and EP rubber which is described as having medium melt flow by the supplier, D&S Plastics International.

"NICHIBAN" refers to the tradename of a tape obtained from a Japanese company.

"STAMYLAN P" is an impact EP copolymer containing 5–10% ethylene in the backbone obtained from DSM having a melt flow at 230° C./2.16 Kg using an 150 R1133 procedure of 4.7 dg/min. as reported by the supplier, Dutch State Mines ("DSM").

"KELTAN TP-0552-2" is a TPO having a melt flow of 6.5 at 230° C./2.16 Kg using an ISO R1133 procedure of 6.5 dg/min. as reported by the supplier, DSM.

"VISTALON 878" is an EP rubber available from Exxon Chemical.

"WIIPA" means with isopropanol wipe prior to painting and "W/O IPA" means without isopropanol wipe painting.

In Examples 18–29, the sample compositions were injection molded to prepare type I tensile bars, which were used in the adhesion tests. The following procedures were used in these examples.

A hand mixed blend of polypropylene, maleated polypropylene, polyether amine and an antioxidant is produced and added to the feed hopper. The extruder heater bands are set to the following profile: feed throat 200° C., 220° C., 220° C., 220° C., 220° C., 220° C. die face.

The blend is fed into the feed throat of a Werner Pfleiderer ZSK30 twin screw extruder. The compounded product is cooled in a water bath and pelletized.

Test specimens were injection molded using an ENGEL 55 ton injection molding machine using the following conditions:

Heating Zones:

|  | Nozzle | Next to Nozzle | Feed Zone | Feed Zone |
|---|---|---|---|---|
|  | 199° C. | 196° C. | 196° C. | 196° C. |
| Mold Temperature | 27° C. | | | |

Physical test specimens were allowed to equilibrate at 24° C. and at 50% relative humidity for 48 hours. Tensile measurements were made according to ASTM D638 on an INSTRON frame using a crosshead speed of 10 cm/min. Flexural properties were measured according to ASTM D790 using a crosshead speed of 1.25 cm/min. Izod impact properties were measured according to ASTM D256.

Dynamical mechanical spectrometry (DMS) was performed using a RHEOMETRICS RDS-II. Injection molded bars measuring 12 mm×50 mm×3 mm were tested in rectangular torsion mode at 1 hz. Strains imposed upon the samples were typically between 0.05% and 0.2%. Measurements were shown to be strain insensitive over the region investigated. The storage and the loss moduli as well as tan delta were measuring from −120° C. up through the melting of the samples, using a heating rate of 2° C./min. in a nitrogen atmosphere. Samples were tested after conditioning at 24° C. and 50% relative humidity for 24 hours.

Paint adhesion testing involved painting four inch injection molded discs with a white, two component urethane automotive paint supplied by RED SPOT PAINTS. The paint is applied with a high volume, low pressure BINKS spray gun. The painted disks are based for 30 minutes at 80° C. The specimens are conditioned 24 hours and then tested using a crosshatch/tape adhesion test where a multibladed scribe is used to generate 100 squares (approximately 2 mm×2 mm per square) on the disks. A piece of tape (Scotch Brand 2040, 3M) is then applied over the squares and then the tape is pulled from the disk. The percentages denoted in the tables reflect the number of painted squares remaining after pulling the tape from the disk.

EXAMPLE 18

TABLE 18A

| Sample | TPO[1] | MAL-PP[2] | JEFFAMINE ® M-2070 | Phenol | PP |
|---|---|---|---|---|---|
| 1 | 99.7% | — | — | 0.3% | |
| 2 | 84.7% | — | — | 0.3% | 15% |
| 3 | 79.7% | — | — | 0.3% | 20% |
| 4 | 84.7% | 15% | — | 0.3% | |
| 5 | 79.7% | 20% | — | 0.3% | |
| 6 | 80.7% | 15% | 4% | 0.3% | |
| 7 | 78.7% | 15% | 6% | 0.3% | |
| 8 | 75.7% | 20% | 4% | 0.3% | |
| 9 | 73.7% | 20% | 6% | 0.3% | |
| 10 | 71.7% | 20% | 8% | 0.3% | |
| 11 | 80.7% | 15% | 4% | 0.3% | |
| 12 | 78.7% | 15% | 6% | 0.3% | |
| 13 | 75.7% | 20% | 4% | 0.3% | |
| 14 | 73.7% | 20% | 6% | 0.3% | |
| 15 | 71.7% | 20% | 8% | 0.3% | |

[1]HIMONT CA53A
[2]EPOLENE E-43

TABLE 18B

|  | 1 | 2 | 3 | 4 | 5 |
|---|---|---|---|---|---|
| Flexural Modulus, MPa | 578 | 725 | 736 | 686 | 741 |
| Stress at Yield, MPa | 19.1 | 23.3 | 24.1 | 22.6 | 24.4 |
| Tensile Elongation, % | 667 | 666 | 622 | 559 | 417 |
| Tensile Strength, MPa | 16.2 | 18.9 | 18.8 | 16.1 | 16.7 |
| Young's Modulus, MPa | 338 | 432 | 453 | 423 | 452 |
| Notched Izod Impact, J/m | 554 | 493 | 382 | 100 | 72.9 |
| −30° C., J/m | 55.0 | 49.4 | 43.3 | 44.3 | 34.0 |
| Unnotched Izod Impact, J/m | 839 | 1025 | 931 | 924 | 997 |
| Falling Dart Impact | | | | | |
| Max Load, J/m | 1430 | 1624 | 1652 | 1556 | 1485 |

TABLE 18B-continued

|  | | | | | |
|---|---|---|---|---|---|
| Total E, J | 21.6 | 23.7 | 25.6 | 23.1 | 16.0 |
| DSC | | | | | |
| Tm, °C. | 156 | 156 | 158 | 153 | 164 |
| Delta H, J/g | 61.8 | 63.5 | 72.0 | 9.7 | 78.2 |
| Tc, °C. | 98.9 | 103 | 104 | 102 | 109 |
| Delta H, J/g | 69.5 | 79.1 | 80.8 | 74.8 | 81.6 |

|  | 6 | 7 | 8 | 9 | 10 |
|---|---|---|---|---|---|
| Flexural Modulus, MPa | 643 | 560 | | | |
| Stress at Yield, MPa | 21.1 | 17.3 | | | |
| Tensile Elongation, % | 296 | 53 | | | |
| Tensile Strength, MPa | 15.3 | 13.2 | | | |
| Young's Modulus, MPa | 390 | 364 | | | |
| Notched Izod Impact, J/m | 154 | 363 | | | |
| −30° C., J/m | 33.2 | 33.7 | | | |
| Unnotched Izod Impact, J/m | 828 | 651 | | | |
| Falling Dart Impact | | | | | |
| Max Load, J/m | 1406 | 1064 | 1247 | 1043 | 905 |
| Total E, J | 19.1 | 11.4 | 15.9 | 11.0 | 9.59 |
| DSC | | | | | |
| Tm, °C. | 152 | | 151 | 150 | 150 |
| Delta H, J/g | 61.6 | | 62.4 | 63.7 | 63.3 |
| Tc, °C. | 101 | | 102 | 103 | 103 |
| Delta H, J/g | 73.7 | | 73.3 | 73.2 | 72.8 |

|  | 11 | 12 | 13 | 14 | 15 |
|---|---|---|---|---|---|
| Flexural Modulus, MPa | 586 | 572 | 579 | 596 | 648 |
| Stress at Yield, MPa | 18.2 | 17.4 | 18.5 | 18.8 | 19.8 |
| Tensile Elongation, % | 666 | 666 | 666 | 666 | 666 |
| Tensile Strength, MPa | 14.8 | 14.4 | 14.9 | 13.3 | 13.7 |
| Young's Modulus, MPa | 348 | 322 | 323 | 342 | 342 |
| Hardness Shore D | 57 | 56 | 57 | 57 | 56 |
| Notched Izod Impact, J/m | 563 | 574 | 116 | 184 | 565 |
| −30° C., J/m | 40.9 | 34.9 | 34.4 | 27.0 | 29.0 |
| Unnotched Izod Impact, J/m | 840 | 780 | 847 | 772 | 756 |
| Falling Dart Impact | | | | | |
| Max Load, J/m | 1541 | 1523 | 1505 | 1557 | 1539 |
| Total E, J | 22.8 | 23.0 | 20.7 | 21.9 | 23.0 |

TABLE 18Ci

ADHESION TEST

| SAMPLE | % Adhesion Test 1 | Test 2 | Test 3 | SAMPLE | % Adhesion Test 1 | Test 2 | Test 3 |
|---|---|---|---|---|---|---|---|
| PP | 0 | 0 | | PP | 0 | 2 | |
| 1 | 0 | 2 | | 1 | 0 | 0 | |
| 2 | 19 | 32 | | 2 | 0 | 1 | |
| 3 | 5 | 1 | | 3 | 1 | 5 | |
| 4 | 49 | 23 | 36 | 4 | 0 | 0 | |
| 5 | 61 | 57 | 59 | 5 | 0 | 0 | |
| 6 | 80 | 99 | 90 | 6 | 65 | 52 | 58 |
| 7 | 100 | 78 | 89 | 7 | 26 | 5 | 16 |
| 8 | 77 | 62 | 70 | 8 | 43 | 30 | 36 |
| 9 | 91 | 90 | 90 | 9 | 90 | 98 | 94 |
| 10 | 93 | 98 | 96 | 10 | 82 | 91 | 6 |
| | | | | 11 | 80 | 94 | 87 |

TABLE 18Cii

CROSS-HATCH ADHESION TEST

| (SAMPLE) | S1 W/IPA |
|---|---|
| 6 | 100% |
| 7 | 100% |
| 9 | 100% |
| 10 | 96% |
| 11 | 100% |
| 14 | 100% |

TABLE 18Ciii

CROSS-HATCH ADHESION TEST

| (SAMPLE) | S1 W/O IPA | S2 W/O IPA |
|---|---|---|
| 11 | 97 | 100 |
| 12 | 0 | 4 |
| 13 | 82 | 88 |
| 14 | 95 | 98 |
| 15 | 7 | 9 |

EXAMPLE 19

TABLE 19A

| Sample | TPO[1] | MAL-PP[2] | JEFFAMINE® M-2070 | Phenol |
|---|---|---|---|---|
| 1 | 99.7% | — | — | 0.3% |
| 2 | 84.7% | 15% | — | 0.3% |
| 3 | 79.7% | 20% | — | 0.3% |
| 4 | 69.7% | 30% | — | 0.3% |
| 5 | 80.7% | 15% | 4% | 0.3%. |
| 6 | 78.7% | 15% | 6% | 0.3% |
| 7 | 75.7% | 20% | 4% | 0.3% |
| 8 | 73.7% | 20% | 6% | 0.3% |
| 9 | 71.7% | 20% | 8% | 0.3% |
| 10 | 65.7% | 30% | 4% | 0.3% |
| 11 | 63.7% | 30% | 6% | 0.3% |
| 12 | 61.7% | 30% | 8% | 0.3% |
| 13 | 80.7% | 15% | 4% | 0.3% |
| 14 | 78.7% | 15% | 6% | 0.3% |
| 15 | 75.7% | 20% | 4% | 0.3% |
| 16 | 73.7% | 20% | 6% | 0.3% |
| 17 | 71.7% | 20% | 8% | 0.3% |
| 18 | 65.7% | 30% | 4% | 0.3% |
| 19 | 63.7% | 30% | 6% | 0.3% |
| 20 | 61.7% | 30% | 8% | 0.3% |

[1]HIMONT CA53A
[2]EPOLENE E-43

TABLE 19B

|  | 1 | 2 | 3 | 4 | 5 |
|---|---|---|---|---|---|
| Flexural Modulus, MPa | 1234 | 1314 | 1329 | 1379 | 1351 |
| Stress at Yield, MPa | 39.1 | 41.6 | 42.5 | 43.9 | 39.9 |
| Tensile Elongation, % | 186 | 59 | 18 | 10 | 159 |
| Tensile Strength, MPa | 25.3 | 25.9 | 26.4 | 26.5 | 25.1 |
| Young's Modulus, MPa | 694 | 732 | 789 | 809 | 715 |
| Notched Izod Impact, J/m | 69.3 | 47.0 | 43.3 | 25.2 | 57.2 |
| −30° C., J/m | 33.5 | 19.1 | 17.7 | 16.5 | 18.8 |
| Unnotched Izod Impact, J/m | 1413 | 1095 | 965 | 694 | 945 |
| Falling Dart Impact | | | | | |
| Max Load, J/m | 2096 | 2148 | 1010 | 344 | 1137 |

TABLE 19B-continued

| | | | | | |
|---|---|---|---|---|---|
| Total E, J | 30.9 | 29.8 | 4.69 | 1.46 | 5.70 |
| DSC | | | | | |
| Tm, °C. | 166 | 165 | | 164 | 165 |
| Delta H, J/g | 86.6 | 85.8 | | 95.2 | 94.2 |
| Tc, °C. | 109 | 109 | | 110 | 109 |
| Delta H, J/g | 106 | 105 | | 104 | 99.3 |

| | 6 | 7 | 8 | 9 | 10 | 11 |
|---|---|---|---|---|---|---|
| Flexural Modulus, MPa | 1128 | 1253 | 1108 | 1017 | 1280 | 1186 |
| Stress at Yield, MPa | 31.6 | 37 | 28.4 | 23 | 35.4 | 31.4 |
| Tensile Elongation, % | 11 | 19 | 8.8 | 8.3 | 8.3 | 6.9 |
| Tensile Strength, MPa | 20.8 | 24.1 | 20 | 17.6 | 22.8 | 20.4 |
| Young's Modulus, MPa | 661 | 708 | 677 | 624 | 742 | 701 |
| Notched Izod Impact, J/m | 72.5 | 50.4 | 47.1 | 42.2 | 26.6 | 17.7 |
| −30° C., J/m | 15.2 | 11.7 | 10.2 | 9.5 | 7.5 | 6.6 |
| Unnotched Izod Impact, J/m | 262 | 475 | 178 | 172 | 241 | 191 |
| Falling Dart Impact | | | | | | |
| Max Load, J/m | 630 | 356 | 329 | 368 | 219 | 220 |
| Total E, J | 3.53 | 1.63 | 2.66 | 2.37 | 1.2 | 1.23 |
| DSC | | | | | | |
| Tm, °C. | 165 | 165 | 166 | 164 | 164 | 164 |
| Delta H, J/g | 93.9 | 97.3 | 95.7 | 91.4 | 97.7 | 93.5 |
| Tc, °C. | 109 | 109 | 110 | 109 | 110 | 108 |
| Delta H, J/g | 98 | 101 | 7.1 | 96 | 101 | 97.3 |

TABLE 19C

ADHESION TEST

| | % Adhesion | | | | % Adhesion | | |
|---|---|---|---|---|---|---|---|
| SAMPLE | Test 1 | Test 2 | Test 3 | SAMPLE | Test 1 | Test 2 | Test 3 |
| PP[1] | 0 | 0 | | PP | 0 | 2 | |
| 1 | 0 | 2 | | 1 | 0 | 0 | |
| 2 | 19 | 32 | | 2 | 0 | 1 | |
| 3 | 5 | 1 | | 3 | 1 | 5 | |
| 4 | 49 | 23 | 36 | 4 | 0 | 0 | |
| 5 | 61 | 57 | | 5 | 0 | 0 | |
| 6 | 80 | 99 | 90 | 6 | 65 | 52 | 58 |
| 7 | 100 | 78 | 89 | 7 | 26 | 5 | 16 |
| 8 | 77 | 62 | 70 | 8 | 43 | 30 | 36 |
| 9 | 91 | 90 | 90 | 9 | 90 | 98 | 94 |
| 10 | 93 | 98 | 96 | 10 | 82 | 91 | 6 |
| | | | | 11 | 80 | 94 | 87 |

| | % Adhesion | | | % Adhesion | |
|---|---|---|---|---|---|
| Sample | Test 1 | Test 2 | Sample | Test 1 | Test 2 |
| 13 | 0% | 0% | 13 | 0% | 0% |
| 14 | 0% | 0% | 14 | 0% | 6% |
| 15 | 1% | 0% | 15 | 20% | 1% |
| 16 | 0% | 11% | 16 | 4% | 36% |
| 17 | 0% | 0% | 17 | 0% | 3% |
| 18 | 28% | 17% | 18 | 23% | 26% |
| 19 | 22% | 13% | 19 | 13% | 11% |
| 20 | 89% | 62% | 20 | 27% | 21% |

[1]Control

EXAMPLE 20

TABLE 20A

| Sample | PP[1] | MAL-PP[2] | JEFFAMINE ® M-2070 | EP RUBBER[3] | Phenol |
|---|---|---|---|---|---|
| 1 | 74.7% | 5% | — | 20% | |
| 2 | 69.7% | 10% | — | 20% | 0.3% |
| 3 | 59.7% | 15% | — | 25% | 0.3% |
| 4 | 70.7% | 5% | 4% | 20% | 0.3% |
| 5 | 68.7% | 5% | 6% | 20% | 0.3% |
| 6 | 66.7% | 5% | 8% | 20% | 0.3% |
| 7 | 65.7% | 10% | 4% | 20% | 0.3% |
| 8 | 63.7% | 10% | 6% | 20% | 0.3% |
| 9 | 61.7% | 10% | 8% | 20% | 0.3% |
| 10 | 55.7% | 15% | 4% | 25% | 0.3% |
| 11 | 53.7% | 15% | 6% | 25% | 0.3% |
| 12 | 51.7% | 15% | 8% | 25% | 0.3% |

[1]AMOCO 1016
[2]EPOLENE E-43
[3]VISTALON

TABLE 20B

| | 1 | 2 | 3 | 4 |
|---|---|---|---|---|
| Flexural Modulus, MPa | 1342 | 1411 | 1333 | 1359 |
| Stress at Yield, MPa | 38.6 | 40.2 | 36.5 | 36.4 |
| Tensile Elongation, % | 168 | 140 | 173 | 451 |
| Tensile Strength, MPa | 25.2 | 25.4 | 22.7 | 22.5 |
| Young's Modulus, MPa | 731 | 750 | 699 | 671 |
| Hardness, Shore D | 66 | 69 | 64 | 67 |
| Notched Izod Impact, J/m | 108 | 59 | 107 | 338 |
| −30° C., J/m | 17.6 | 16.6 | 18.0 | 23.1 |
| Unnotched Izod Impact, J/m | 1106 | 1199 | 1311 | 1252 |
| Falling Dart Impact | | | | |
| Maximum Load, J/m | 2045 | 2035 | 1826 | 1879 |
| −30° C., J/m | 3417 | 3351 | 3122 | 2888 |
| Total Energy, J | 30.0 | 29.2 | 26.2 | 25.9 |
| −30° C., J | 41.9 | 34.6 | 39.4 | 22.2 |
| | 5 | 6 | 7 | 8 |
| Flexural Modulus, MPa | 1070 | 1029 | 1168 | 1064 |
| Stress at Yield, MPa | 29.6 | 28.0 | 31.6 | 28.3 |
| Tensile Elongation, % | 125 | 106 | 188 | 119 |
| Tensile Strength, MPa | 19.1 | 18.1 | 19.9 | 18.2 |
| Young's Modulus, MPa | 575 | 552 | 595 | 555 |
| Hardness, Shore D | 63 | 61 | 64 | 63 |
| Notched Izod Impact, J/m | 361 | 444 | 273 | 286 |
| −30° C., J/m | 28.4 | 43.8 | 19.2 | 18.4 |
| Unnotched Izod Impact, J/m | 867 | 816 | 874 | 785 |
| Falling Dart Impact | | | | |
| Maximum Load, J/m | 1710 | 1495 | 1858 | 1338 |
| −30° C., J/m | 920 | 595 | 2101 | 385 |
| Total Energy, J | 18.5 | 14.8 | 22.8 | 13.5 |
| −30° C., J | 30.5 | 2.19 | 12.4 | 1.58 |
| | 9 | 10 | 11 | 12 |
| Flexural Modulus, MPa | 1006 | 178 | 968 | 915 |
| Stress at Yield, MPa | 26.4 | 28.8 | 26.4 | 24.0 |
| Tensile Elongation, % | 122 | 196 | 184 | 40 |
| Tensile Strength, MPa | 17.1 | 18.2 | 17.2 | 15.6 |
| Young's Modulus, MPa | 523 | 553 | 527 | 500 |
| Hardness, Shore D | 61 | 62 | 61 | 60 |
| Notched Izod Impact, J/m | 256 | 277 | 240 | 127 |
| −30° C., J/m | 24.0 | 25.0 | 26.4 | 13.8 |
| Unnotched Izod Impact, J/m | 729 | 904 | 860 | 782 |
| Falling Dart Impact | | | | |
| Maximum Load, J/m | 1024 | 1606 | 1317 | 1110 |
| −30° C., J/m | 339 | 1021 | 500 | 561 |
| Total Energy, J | 9.2 | 18.9 | 13.5 | 9.9 |
| −30° C., J | 1.74 | 4.31 | 2.50 | 2.69 |

TABLE 20C

CROSS-HATCH ADHESION TEST

| SAMPLE | S1 W/IPA | S2 W/IPA | S1 W/O IPA | S2 W/O IPA |
|---|---|---|---|---|
| 1 | 19% | 20% | 0% | 2% |
| 2 | 19% | 44% | 11% | 13% |
| 3 | 50% | 89% | 99% | 100% |
| 4 | 40% | 59% | 37% | 52% |
| 5 | 29% | 55% | 5% | 33% |
| 6 | 92% | 100% | 4% | 39% |
| 7 | 82% | 89% | 28% | 32% |
| 8 | 95% | 100% | 68% | 100% |
| 9 | 97% | 78% | 70% | 75% |
| 1 | 83% | 100% | 99% | 100% |
| 11 | 99% | 100% | 82% | 96% |
| 12 | 92% | 100% | 100% | 100% |

EXAMPLE 21

TABLE 21A

| Sample | TPO[1] | MAL-PP[2] | JEFFAMINE® M-2070 | Phenol |
|---|---|---|---|---|
| 1 | 100% | — | — | 0.3% |
| 2 | 90% | 10% | — | 0.3% |
| 3 | 85% | 15% | — | 0.3% |
| 4 | 80% | 20% | — | — |
| 5 | 85.8% | 10% | 4% | 0.2% |
| 6 | 83.8% | 10% | 6% | 0.2% |
| 7 | 80.8% | 15% | 4% | 0.2% |
| 8 | 78.8% | 15% | 6% | 0.2% |
| 9 | 75.8% | 20% | 4% | 0.2% |
| 10 | 73.8% | 20% | 6% | 0.2% |
| 11 | 80.8% | 15% | 4% | 0.2% |
| 12 | 78.8% | 15% | 6% | 0.2% |
| 13 | 75.8% | 20% | 4% | 0.2% |
| 14 | 73.8% | 20% | 6% | 0.2% |

[1]DEXFLEX D161
[2]EPOLENE E-43

TABLE 21B

| | 1 | 2 | 3 | 4 | 5 |
|---|---|---|---|---|---|
| Flexural Modulus, MPa | 944 | 985 | 1050 | 1101 | 857 |
| Stress at Yield, MPa | 25.1 | 27.4 | 29.3 | 30.7 | 23.9 |
| Tensile Elongation, % | 506 | 186 | 116 | 78 | 466 |
| Tensile Strength, MPa | 17.8 | 18.7 | 19.5 | 20.1 | 16.8 |
| Young's Modulus, MPa | 551 | 581 | 629 | 654 | 491 |
| Hardness Shore D | 63 | 65 | 67 | 68 | 63 |
| Notched Izod Impact, J/m | 576 | 343 | 84 | 54 | 475 |
| −30° C., J/m | 35.9 | 31.5 | 25.1 | 16.9 | 33.6 |
| Unnotched Izod Impact, J/m | 1027 | 965 | 1174 | 1066 | 944 |
| Falling Dart Impact | | | | | |
| Max Load, J/m | 1669 | 1678 | 1703 | 1721 | 1509 |
| −30° C., J/m | 2980 | 3140 | 3094 | 2880 | 2397 |
| Total E, J | 24.1 | 22.8 | 22.7 | 21.8 | 21.9 |
| −30° C., J | 36.9 | 38.0 | 29.7 | 17.0 | 28.8 |
| | 6 | 7 | 8 | 9 | 10 |
| Flexural Modulus, MPa | 748 | 832 | 745 | 788 | 804 |
| Stress at Yield, MPa | 20.8 | 23.0 | 20.4 | 22.6 | 22.4 |
| Tensile Elongation, % | 71 | 100 | 31 | 26 | 18 |
| Tensile Strength, MPa | 14.7 | 16.1 | 14.5 | 16.3 | 15.0 |
| Young's Modulus, MPa | 445 | 486 | 451 | 492 | 460 |
| Hardness Shore D | 61 | 64 | 451 | 61 | 60 |
| Notched Izod Impact, J/m | 331 | 252 | 60 | 74 | 56 |
| −30° C., J/m | 37.8 | 22.2 | 144 | 17.2 | 18.3 |
| Unnotched Izod Impact, J/m | 736 | 737 | 22.7 | 419 | 310 |

TABLE 21B-continued

| Falling Dart Impact | | | | | |
|---|---|---|---|---|---|
| Max Load, J/m | 1340 | 1408 | 1047 | 1047 | 704 |
| −30° C., J/m | 550 | 422 | 356 | 411 | 339 |
| Total E, J | 15.1 | 15.7 | 9.0 | 7.4 | 5.1 |
| −30° C., J | 1.31 | 0.82 | 0.62 | 0.70 | 0.53 |
| | 11 | 12 | 13 | 14 | |
| Flexural Modulus, MPa | 892 | 802 | 945 | 874 | |
| Stress at yield, MPa | 26.2 | 23.7 | 27.1 | 25.4 | |
| Tensile Elongation, % | 221 | 511 | 187 | 370 | |
| Tensile Strength, MPa | 18.1 | 16.8 | 18.3 | 17.4 | |
| Young's Modulus, MPa | 525 | 467 | 539 | 495 | |
| Hardness Shore D | 63 | 63 | 64 | 61 | |
| Notched Izod Impact, J/m | 159 | 511 | 99 | 118 | |
| −30° C., J/m | 26.6 | 25.9 | 20.6 | 18.7 | |
| Unnotched Izod Impact, J/m | 1020 | 934 | 1174 | 913 | |
| Falling Dart Impact | | | | | |
| Max Load, J/m | 1610 | 1603 | 1591 | 1618 | |
| −30° C., J/m | 2655 | 1541 | 1517 | 1259 | |
| Total E, J | 22.4 | 23.6 | 19.1 | 19.5 | |
| −30° C., J | 20.8 | 5.45 | 6.24 | 4.88 | |

TABLE 21C

CROSS-HATCH ADHESION TEST

| (SAMPLE) | S1 W/IPA | S2 W/IPA | S1 W/O IPA | S2 W/O IPA |
|---|---|---|---|---|
| PP[1] | 0.00 | 0.00 | 0.00 | |
| 1 | 3 | 18 | 78 | 27 |
| 2 | 63 | 63 | 94 | 48 |
| 3 | 79 | 59 | 62 | 100 |
| 4 | 0.00 | 14 | 87 | 83 |
| 5 | 100 | 100 | 100 | 100 |
| 6 | 100 | 100 | 100 | 100 |
| 7 | 100 | 100 | 99 | 100 |
| 8 | 100 | 100 | 97 | 100 |
| 9 | 100 | 100 | 100 | 100 |
| 10 | 100 | 100 | 100 | 100 |
| 11 | 67 | 67 | 94 | 88 |
| 12 | 62 | 62 | 10 | 22 |
| 13 | 100 | 100 | 100 | 100 |
| 14 | 100 | 100 | 100 | 100 |

[1]Control.

EXAMPLE 22

TABLE 22A

| Sample | TPO[1] | MAL-PP[2] | JEFFAMINE® M-2070 | Phenol |
|---|---|---|---|---|
| 1 | 100% | — | — | — |
| 2 | 90% | 10% | — | — |
| 3 | 85% | 15% | — | — |
| 4 | 80% | 20% | — | — |
| 5 | 85.8% | 10% | 4% | 0.2% |
| 6 | 83.8% | 10% | 6% | 0.2% |
| 7 | 80.8% | 15% | 4% | 0.2% |
| 8 | 78.8% | 15% | 6% | 0.2% |
| 9 | 75.8% | 20% | 4% | 0.2% |
| 10 | 73.8% | 20% | 6% | 0.2% |
| 11 | 80.8% | 15% | 4% | 0.2% |
| 12 | 78.8% | 15% | 6% | 0.2% |
| 13 | 75.8% | 20% | 4% | 0.2% |
| 14 | 73.8% | 20% | 6% | 0.2% |

[1]STAMYLAN P
[2]EPOLENE E-43

TABLE 22B

|  | 1 | 2 | 3 | 4 | 5 | 6 | 7 |
|---|---|---|---|---|---|---|---|
| Flexural Modulus, MPa | 1053 | 1123 | 1185 | 1259 | 1100 | 1025 | 1040 |
| Stress at Yield, MPa | 32.3 | 35.3 | 36.5 | 38.9 | 32.7 | 30.0 | 31.0 |
| Tensile Elongation, % | 453 | 173 | 141 | 36 | 168 | 30 | 22 |
| Tensile Strength, MPa | 21.2 | 22.7 | 23.1 | 23.7 | 21.5 | 19.9 | 20.3 |
| Young's Modulus, MPa | 568 | 647 | 665 | 696 | 581 | 571 | 592 |
| Notched Izod Impact, J/m | 716 | 607 | 159 | 118 | 519 | 482 | 219 |
| −30° C., J/m | 77.4 | 43.5 | 34.7 | 23.5 | 37.0 | 47.8 | 33.5 |
| Unnotched Izod Impact, J/m | 1075 | 1246 | 1078 | 1124 | 911 | 853 | 629 |
| Falling Dart Impact |  |  |  |  |  |  |  |
| Max Load, J/m | 1987 | 2002 | 2013 | 2052 | 1853 | 1614 | 1632 |
| −30° C., J/m | 3562 | 3721 | 2804 | 1154 | 1464 | 461 | 503 |
| Total Energy, J | 31.4 | 31.1 | 30.0 | 28.8 | 25.9 | 17.4 | 18.1 |
| −30° C., J | 45.2 | 42.7 | 17.2 | 3.6 | 5.3 | 0.9 | 1.0 |

|  | 8 | 9 | 10 | 11 | 12 | 13 | 14 |
|---|---|---|---|---|---|---|---|
| Flexural Modulus, MPa | 995 | 1062 | 999 | 1107 | 1083 | 1131 | 1076 |
| Stress at Yield, MPa | 26.9 | 30.8 | 28.4 | 33.9 | 32.2 | 34.0 | 32.5 |
| Tensile Elongation, % | 14 | 15 | 11 | 218 | 483 | 80 | 230 |
| Tensile Strength, MPa | 18.3 | 19.9 | 18.5 | 21.4 | 20.1 | 21.7 | 20.8 |
| Young's Modulus, MPa | 542 | 582 | 560 | 587 | 517 | 619 | 582 |
| Notched Izod Impact, J/m | 238 | 109 | 104 | 495 | 563 | 145 | 157 |
| −30° C., J/m | 34.6 | 24.2 | 22.7 | 27.1 | 39.8 | 28.5 | 26.8 |
| Unnotched Izod Impact, J/m | 514 | 464 | 336 | 1029 | 1008 | 1004 | 863 |
| Falling Dart Impact |  |  |  |  |  |  |  |
| Max Load, J/m | 1301 | 1003 | 1021 | 2017 | 2002 | 941 | 1878 |
| −30° C., J/m | 460 | 455 |  | 3633 | 1244 | 1140 | 1193 |
| Total Energy, J | 11.0 | 8.3 | 6.3 | 30.2 | 29.5 | 7.9 | 26.4 |
| −30° C., J | 0.7 | 0.7 |  | 26.8 | 3.6 | 3.2 | 3.5 |

TABLE 22C

CROSS-HATCH ADHESION TEST

| DISC SAMPLE TAPE SAMPLE | S1 3M[1] W/IPA | S2 3M W/IPA | S1 NICHIBAN W/O IPA | S2 NICHIBAN W/O IPA |
|---|---|---|---|---|
| 1 | 6% | 0% | 0% | 3% |
| 2 | 1% | 0% | 14% | 1% |
| 3 | 1% | 0% | 7% | 2% |
| 4 | 0% | 6% | 1% | 15% |
| 5 | 45% | 80% | 83% | 32% |
| 6 | 96% | 98% | 96% | 100% |
| 7 | 88% | 96% | 82% | 92% |
| 8 | 89% | 78% | 74% | 96% |
| 9 | 94% | 87% | 100% | 98% |
| 10 | 99% | 100% | 100% | 100% |
| 11 | 3% | 47% | 20% | 27% |
| 12 | 7% | 1% | 2% | 3% |
| 13 | 38% | 79% | 35% | 78% |
| 14 | 85% | 65% | 100% | 97% |

[1]Scotch Brand 2040

TABLE 22C

CROSS-HATCH ADHESION TEST

| DISC SAMPLE SAMPLE | S1 W/IPA | S2 W/IPA | S1 W/O IPA | S2 W/O IPA |
|---|---|---|---|---|
| 1 | 4% | 1% | 5% | 0% |
| 2 | 0% | 0% | 7% | 0% |
| 3 | 4% | 0% | 4% | 10% |
| 4 | 9% | 1% | 17% | 1% |
| 5 | 26% | 79% | 57% | 46% |
| 6 | 95% | 90% | 93% | 92% |
| 7 | 95% | 89% | 94% | 89% |
| 8 | 83% | 84% | 97% | 97% |
| 9 | 85% | 94% | 98% | 96% |
| 10 | 96% | 88% | 99% | 97% |
| 11 | 83% | 58% | 90% | 71% |
| 12 | 0% | 5% | 8% | 20% |
| 13 | 86% | 95% | 74% | 92% |
| 14 | 97% | 86% | 92% | 98% |
| 15[1] | 98% | 98% | 100% | 100% |

[1]Reactive extrusion product of 73% STAMYLAN P, 20% EPOLENE E-43, 6% Jeffamine ® M-2070, and 0.2% Phenol.

EXAMPLE 23

TABLE 23A

| Sample | PP[1] | MAL-PP[2] | JEFFAMINE ® M-2070 | EP RUBBER[3] | Phenol |
|---|---|---|---|---|---|
| 1 | 69.7% | — | — | 30% | 0.3% |
| 2 | 59.7% | 10% | — | 30% | 0.3% |
| 3 | 56.7% | 13% | — | 30% | 0.3% |
| 4 | 52.2% | 17.5% | — | 30% | 0.3% |
| 5 | 57.7% | 10% | 2% | 30% | 0.3% |
| 6 | 55.7% | 10% | 4% | 30% | 0.3% |
| 7 | 53.7% | 10% | 6% | 30% | 0.3% |
| 8 | 54.7% | 13% | 2% | 30% | 0.3% |
| 9 | 52.7% | 13% | 4% | 30% | 0.3% |
| 10 | 50.7% | 13% | 6% | 30% | 0.3% |
| 11 | 50.2% | 17.5% | 2% | 30% | 0.3% |
| 12 | 48.2% | 17.5% | 4% | 30% | 0.3% |
| 13 | 46.2% | 17.5% | 6% | 30% | 0.3% |
| 14 | 57.7% | 10% | 2% | 30% | 0.3% |
| 15 | 55.7% | 10% | 4% | 30% | 0.3% |
| 16 | 53.7% | 10% | 6% | 30% | 0.3% |
| 17 | 54.7% | 13% | 2% | 30% | 0.3% |
| 18 | 52.7% | 13% | 4% | 30% | 0.3% |
| 19 | 50.7% | 13% | 6% | 30% | 0.3% |
| 20 | 50.2% | 17.5% | 2% | 30% | 0.3% |
| 21 | 48.2% | 17.5% | 4% | 30% | 0.3% |
| 22 | 46.2% | 17.5% | 6% | 30% | 0.3% |

[1]AMOCO 1016
[2]EPOLENE E-43
[3]VISTALON 878

TABLE 23B

|  | 1 | 2 | 3 | 4 | 5 | 6 | 7 | 8 |
|---|---|---|---|---|---|---|---|---|
| Flexural Modulus, MPa | 1064 | 1095 | 1166 | 1156 | 1062 | 843 | 741 | 959 |
| Stress at Yield, MPa | 28.5 | 29.7 | 32.5 | 31.3 | 27.4 | 22.8 | 20.1 | 25.7 |
| Tensile Elongation, % | 483 | 211 | 181 | 151 | 252 | 356 | 107 | 316 |
| Tensile Strength, MPa | 19.5 | 19.7 | 20.2 | 19.2 | 18.1 | 15.2 | 13.7 | 16.6 |
| Young's Modulus, MPa | 583 | 608 | 608 | 611 | 551 | 456 | 412 | 487 |
| Hardness, Shore D | 64 | 63 | 65 | 64 | 61 | 60 | 59 | 59 |

TABLE 23B-continued

|  | | | | | | | | |
|---|---|---|---|---|---|---|---|---|
| Notched Izod Impact, J/m | 576 | 436 | 252 | 161 | 510 | 449 | 450 | 427 |
| −30° C., J/m | 58.4 | 28.0 | 22.2 | 26.0 | 33.0 | 54.3 | 54.9 | 31.4 |
| Unnotched Izod Impact, J/m | 979 | 957 | 976 | 867 | 955 | 847 | 815 | 819 |
| Falling Dart Impact | | | | | | | | |
| Max Load, J/m | 1711 | 1760 | 1710 | 1607 | 1565 | 1431 | 1199 | 1514 |
| −30° C., J/m | 3096 | 3236 | 3245 | 3177 | 3014 | 1487 | 802 | 2962 |
| Total Energy, J | 25.5 | 29.2 | 22.5 | 20.6 | 27.3 | 18.1 | 14.2 | 20.0 |
| −30° C., J | 39.1 | 41.5 | 42.6 | 37.4 | 40.1 | 6.8 | 3.6 | 19.6 |
| Ductile/5 | 5 | 5 | 5 | 5 | 5 | 5 | 5 | 5 |
| −30° C./5 | 5 | 5 | 5 | 3 | 5 | 0 | 0 | 0 |

|  | 9 | 10 | 11 | 12 | 13 | 14 | 15 | 16 |
|---|---|---|---|---|---|---|---|---|
| Flexural Modulus, MPa | 798 | 746 | 863 | 792 | 709 | 991 | 964 | 907 |
| Stress at Yield, MPa | 22.2 | 20.3 | 23.9 | 21.8 | 19.5 | 26.8 | 25.4 | 23.6 |
| Tensile Elongation, % | 157 | 65 | 252 | 94 | 33 | 498 | 494 | 656 |
| Tensile Strength, MPa | 15.0 | 13.7 | 16.3 | 14.9 | 13.6 | 18.1 | 17.3 | 17.5 |
| Young's Modulus, MPa | 437 | 387 | 476 | 436 | 408 | 503 | 479 | 437 |
| Hardness, Shore D | 61 | 59 | 61 | 60 | 60 | 62 | 59 | 58 |
| Notched Izod Impact, J/m | 439 | 384 | 258 | 271 | 205 | 530 | 575 | 586 |
| −30° C., J/m | 40.9 | 31.0 | 25.5 | 28.6 | 29.8 | 49.8 | 33.9 | 56.1 |
| Unnotched Izod Impact, J/m | 818 | 679 | 712 | 778 | 665 | 1146 | 1108 | 1012 |
| Falling Dart Impact, J/m | | | | | | | | |
| Max Load, J/m | 1370 | 1224 | 1452 | 1258 | 1027 | 1649 | 1631 | 1554 |
| −30° C., J/m | 1224 | 718 | 1229 | 580 | 487 | 3098 | 3096 | 3060 |
| Total Energy, J | 16.1 | 14.6 | 18.6 | 13.9 | 11.9 | 24.0 | 23.6 | 23.8 |
| −30° C., J | 5.0 | 3.4 | 5.8 | 2.6 | 3.4 | 40.0 | 40.1 | 39.8 |
| Ductile/5 | 5 | 5 | 5 | 5 | 5 | 5 | 5 | 5 |
| −30° C./5 | 0 | 0 | 0 | 0 | 0 | 5 | 5 | 5 |

|  | 17 | 18 | 19 | 20 | 21 | 22 |
|---|---|---|---|---|---|---|
| Flexural Modulus, MPa | 986 | 946 | 921 | 964 | 922 | 889 |
| Stress at Yield, MPa | 27.2 | 25.0 | 23.5 | 26.4 | 24.8 | 23.0 |
| Tensile Elongation, % | 511 | 578 | 605 | 87 | 109 | 202 |
| Tensile Strength, MPa | 1.67 | 16.0 | 15.7 | 17.7 | 16.7 | 16.2 |
| Young's Modulus, MPa | 456 | 439 | 404 | 518 | 477 | 475 |
| Hardness, Shore D | 62 | 60 | 58 | 62 | 62 | 54 |
| Notched Izod Impact, J/m | 463 | 549 | 594 | 209 | 357 | 551 |
| −30° C., J/m | 27.7 | 30.9 | 34.1 | 19.9 | 30.2 | 24.7 |
| Unnotched Izod Impact, J/m | 996 | 922 | 804 | 899 | 1011 | 774 |
| Falling Dart Impact | | | | | | |
| Max Load, J/m | 1541 | 1602 | 1534 | 1484 | 1429 | 1418 |
| −30° C., J/m | 3199 | 3171 | 3131 | 2932 | 3215 | 3225 |
| Total Energy, J | 20.9 | 22.8 | 22.2 | 18.2 | 18.4 | 20.6 |
| −30° C., J | 41.6 | 41.9 | 41.4 | 24.4 | 40.6 | 41.8 |
| Ductile/5 | 5 | 5 | 5 | 5 | 5 | 5 |
| −30° C./5 | 5 | 5 | 5 | 1 | 5 | 5 |

TABLE 23C

CROSS-HATCH ADHESION TEST

| (SAMPLE) | S1 W/IPA | S2 W/IPA | S1 W/O IPA | S2 W/O IPA |
|---|---|---|---|---|
| PP[1] | 0% | | 0% | |
| 1 | 94% | 72% | 35% | 1% |
| 2 | 74% | 57% | 73% | 45% |
| 3 | 10% | 25% | 26% | 36% |
| 4 | 80% | 62% | 16% | 24% |
| 5 | 94% | 97% | 54% | 94% |
| 6 | 99% | 100% | 94% | 97% |
| 7 | 100% | 100% | 100% | 100% |
| 8 | 100% | 100% | 100% | 100% |
| 9 | 100% | 100% | 100% | 100% |
| 10 | 100% | 100% | 100% | 100% |
| 11 | 100% | 100% | 97% | 100% |
| 12 | 100% | 100% | 100% | 100% |
| 13 | 97% | 95% | 98% | 100% |
| 14 | 94% | 100% | 69% | 79% |
| 15 | 65% | 59% | 0% | 0% |
| 16 | 39% | 52% | 0% | 0% |
| 17 | 100% | 100% | 67% | 71% |
| 18 | 85% | 88% | 8% | 2% |
| 19 | 75% | 43% | 20% | 3% |
| 20 | 100% | 100% | 99% | 100% |
| 21 | 100% | 100% | 93% | 100% |
| 22 | 83% | 78% | 2% | 2% |

[1]Control

EXAMPLE 24

TABLE 24A

| Sample | TPO[1] | MAL-PP[2] | JEFFAMINE ® M-2070 | Phenol |
|---|---|---|---|---|
| 1 | 100% | — | — | — |
| 2 | 90% | 10% | — | — |
| 3 | 85% | 15% | — | — |
| 4 | 80% | 20% | — | — |
| 5 | 85.8% | 10% | 4% | 0.2% |
| 6 | 83.8% | 10% | 6% | 0.2% |
| 7 | 80.8% | 15% | 4% | 0.2% |
| 8 | 78.8% | 15% | 6% | 0.2% |
| 9 | 75.8% | 20% | 4% | 0.2% |
| 10 | 73.8% | 20% | 6% | 0.2% |
| 11 | 80.8% | 15% | 4% | 0.2% |
| 12 | 78.8% | 15% | 6% | 0.2% |
| 13 | 75.8% | 20% | 4% | 0.2% |
| 14 | 73.8% | 20% | 6% | 0.2% |

[1]KELTAN TP 0552-2
[2]EPOLENE E-43

TABLE 24B

|  | 1 | 2 | 3 | 4 | 5 | 6 | 7 |
|---|---|---|---|---|---|---|---|
| Flexural Modulus, MPa | 915 | 971 | 1034 | 1076 | 799 | 724 | 780 |
| Stress at Yield, MPa | 23.1 | 25.5 | 27.6 | 28.4 | 21.5 | 18.4 | 21.1 |
| Tensile Elongation, % | 529 | 61 | 36 | 16 | 38 | 20 | 17 |
| Tensile Strength, MPa | 15.6 | 16.1 | 16.6 | 17.0 | 14.8 | 13.4 | 14.8 |
| Young's Modulus, MPa | 504 | 534 | 570 | 588 | 459 | 432 | 461 |
| Hardness, Shore D | 61 | 61 | 63 | 64 | 58 | 56 | 58 |
| Notched Izod Impact, J/m | 669 | 551 | 160 | 111 | 486 | 402 | 413 |
| −30° C., J/m | 700 | 101 | 71.3 | 56.7 | 96.4 | 75.6 | 70.6 |
| Unnotched Izod Impact, J/m | 944 | 877 | 942 | 937 | 810 | 706 | 805 |

TABLE 24B-continued

Falling Dart Impact

| | | | | | | | |
|---|---|---|---|---|---|---|---|
| Max Load, J/m | 1695 | 1732 | 1399 | 1747 | 1522 | 1178 | 1453 |
| −30° C., J/m | 2912 | 3013 | 3110 | 2932 | 1389 | 529 | 839 |
| Total Energy, J | 27.8 | 26.9 | 21.0 | 22.2 | 19.0 | 14.4 | 17.8 |
| −30° C., J | 40.5 | 40.6 | 29.9 | 18.6 | 5.4 | 4.2 | 4.3 |
| Ductile/5 | 5 | 5 | 5 | 5 | 5 | 5 | 5 |
| −30° C./5 | 5 | 5 | 1 | 0 | 0 | 0 | 0 |

| | 8 | 9 | 10 | 11 | 12 | 13 | 14 |
|---|---|---|---|---|---|---|---|
| Flexural Modulus, MPa | 718 | 812 | 760 | 863 | 798 | 871 | 845 |
| Stress at Yield, MPa | 19.0 | 21.7 | 19.9 | 22.8 | 21.6 | 23.4 | 22.9 |
| Tensile Elongation, % | 12 | 11 | 11 | 82 | 478 | 65 | 92 |
| Tensile Strength, MPa | 13.7 | 15.0 | 13.9 | 15.7 | 15.6 | 16.3 | 16.1 |
| Young's Modulus, MPa | 441 | 487 | 462 | 473 | 463 | 486 | 478 |
| Hardness, Shore D | 56 | 59 | 58 | 62 | 59 | 61 | 61 |
| Notched Izod Impact, J/m | 438 | 128 | 200 | 519 | 620 | 147 | 166 |
| −30° C., J/m | 42.3 | 38.4 | 29.1 | 61.7 | 44.1 | 50.8 | 37.7 |
| Unnotched Izod Impact, J/m | 570 | 574 | 374 | 850 | 855 | 905 | 828 |

Falling Dart Impact

| | | | | | | | |
|---|---|---|---|---|---|---|---|
| Max Load, J/m | 1155 | 1284 | 924 | 1544 | 1579 | 1516 | 1544 |
| −30° C., J/m | 454 | 545 | 487 | 2989 | 2300 | 2287 | 1526 |
| Total Energy, J | 13.2 | 10.7 | 6.7 | 19.9 | 24.4 | 16.3 | 21.1 |
| −30° C., J | 3.4 | 2.9 | 3.6 | 22.3 | 12.0 | 10.8 | 10.4 |
| Ductile/5 | 5 | 0 | 0 | 5 | 5 | 0 | 5 |
| −30° C./5 | 0 | 0 | 0 | 0 | 0 | 0 | 0 |

TABLE 24C

CROSS-HATCH ADHESION TEST

| (SAMPLE) | S1 W/IPA | S2 W/IPA | S1 W/O IPA | S2 W/O IPA |
|---|---|---|---|---|
| PP[1] | 0% | | 0% | |
| 1 | 96% | 88% | 86% | 90% |
| 2 | 72% | 75% | 53% | 24% |
| 3 | 69% | 41% | 43% | 10% |
| 4 | 41% | 15% | 40% | 3% |
| 5 | 100% | 100% | 100% | 100% |
| 6 | 100% | 100% | 100% | 100% |
| 7 | 100% | 100% | 100% | 100% |
| 8 | 100% | 100% | 100% | 100% |
| 9 | 100% | 100% | 100% | 100% |
| 10 | 100% | 100% | 99% | 100% |
| 11 | 100% | 100% | 100% | 100% |
| 12 | 98% | 100% | 78% | 3% |
| 13 | 100% | 88% | 100% | 100% |
| 14 | 100% | 100% | 100% | 100% |
| 15[2] | 100% | 100% | | |

[1]Control
[2]Reactive extrusion product of 73% STAMYLAN P, 20% EPOLENE E-43, 6% Jeffamine ® M-2070, and 0.2% Phenol.

EXAMPLE 25

TABLE 25A

| Sample | PP[1] | MAL-PP[2] | AMINE[3] | EP RUBBER[4] | Phenol |
|---|---|---|---|---|---|
| 1 | 74.7% | 5% | — | 20% | 0.3% |
| 2 | 69.7% | 10% | — | 20% | 0.3% |
| 3 | 59.7% | 15% | — | 25% | 0.3% |
| 4 | 70.7% | 5% | 4% | 20% | 0.3% |
| 5 | 68.7% | 5% | 6% | 20% | 0.3% |
| 6 | 66.7% | 5% | 8% | 20% | 0.3% |
| 7 | 65.7% | 10% | 4% | 20% | 0.3% |
| 8 | 63.7% | 10% | 6% | 20% | 0.3% |
| 9 | 61.7% | 10% | 8% | 20% | 0.3% |
| 10 | 55.7% | 15% | 4% | 25% | 0.3% |
| 11 | 53.7% | 15% | 6% | 25% | 0.3% |
| 12 | 51.7% | 15% | 8% | 25% | 0.3% |

[1]AMOCO 1016
[2]EPOLENE E-43
[3]A polyether monoamine containing 40 ethylene oxide units and 2.4 propylene oxide units, generally of the formula shown in the Glossary for JEFFAMINE ® M-2070, which is referred to within Huntsman Corporation as "XTJ-A18."
[4]VISTALON 878

TABLE 25B

| | 1 | 2 | 3 | 4 | 5 | 6 |
|---|---|---|---|---|---|---|
| Flexural Modulus, MPa | 1233 | 1218 | 1134 | 1197 | 1098 | 994 |
| Stress at Yield, MPa | 35.1 | 35.2 | 31.7 | 33.0 | 30.9 | 28.6 |
| Tensile Elongation, % | 189 | 182 | 148 | 159 | 262 | 116 |
| Tensile Strength, MPa | 23.7 | 23.6 | 21.3 | 22.0 | 20.3 | 18.4 |
| Young's Modulus, MPa | 642 | 648 | 612 | 618 | 580 | 527 |
| Hardness, Shore D | 64 | 65 | 63 | 65 | 63 | 62 |
| Notched Izod Impact, J/m | 128 | 82 | 100 | 282 | 451 | 470 |
| −30° C., J/m | 15.2 | 16.2 | 17.2 | 16.0 | 15.6 | 23.1 |
| Unnotched Izod Impact, J/m | 1056 | 1237 | 1144 | 1091 | 969 | 981 |

Falling Dart Impact

| | | | | | | |
|---|---|---|---|---|---|---|
| Max Load, J/m | 1915 | 1848 | 1728 | 1788 | 1753 | 1408 |
| −30° C., J/m | 3480 | 3496 | 3325 | 2495 | 2191 | 479 |
| Total Energy, J | 27.0 | 25.2 | 22.2 | 22.9 | 22.5 | 14.2 |
| −30° C., J | 43.5 | 40.0 | 42.2 | 20.4 | 9.6 | 2.0 |
| Ductile/5 | 5 | 5 | 5 | 5 | 5 | 5 |
| −30° C./5 | 5 | 4 | 5 | 2 | 0 | 0 |

| | 7 | 8 | 9 | 10 | 11 | 12 |
|---|---|---|---|---|---|---|
| Flexural Modulus, MPa | 1161 | 1029 | 970 | 976 | 922 | 910 |
| Stress at Yield, MPa | 32.1 | 29.2 | 28.5 | 26.8 | 25.6 | 25.3 |
| Tensile Elongation, % | 374 | 240 | 118 | 376 | 474 | 185 |
| Tensile Strength, MPa | 20.5 | 18.9 | 18.3 | 17.7 | 16.0 | 17.0 |
| Young's Modulus, MPa | 570 | 552 | 521 | 505 | 469 | 486 |
| Hardness, Shore D | 64 | 61 | 60 | 61 | 60 | 60 |
| Notched Izod Impact, J/m | 366 | 383 | 315 | 391 | 425 | 341 |
| −30° C., J/m | 17.9 | 16.8 | 19.2 | 20.2 | 19.8 | 17.6 |
| Unnotched Izod Impact, J/m | 893 | 781 | 854 | 857 | 799 | 827 |

Falling Dart Impact

| | | | | | | |
|---|---|---|---|---|---|---|
| Max Load, J/m | 1787 | 1449 | 1046 | 1546 | 1252 | 995 |
| −30° C., J/m | 3079 | 588 | 542 | 1668 | 676 | 492 |
| Total Energy, J | 23.5 | 14.8 | 10.2 | 18.4 | 13.2 | 10.0 |
| −30° C., J | 20.8 | 2.6 | 2.6 | 7.0 | 2.6 | 2.2 |
| Ductile/5 | 5 | 5 | 5 | 5 | 5 | 5 |
| −30° C./5 | 0 | 0 | 0 | 0 | 0 | 0 |

TABLE 25C

CROSS-HATCH ADHESION TEST

| DISC SAMPLE TAPE SAMPLE | S1 3M[1] W/O IPA | S2 3M W/O IPA | S1 NICHIBAN W/O IPA | S2 NICHIBAN W/O IPA |
|---|---|---|---|---|
| PP[2] | 0% | | 1% | |
| 1 | 8% | 4% | 1% | 12% | 49% |
| 2 | 1% | 2% | 4% | 39% | 43% |
| 3 | 87% | 90% | 91% | 97% | 100% |
| 4 | 49% | 53% | 57% | 87% | 95% |

TABLE 25C-continued

CROSS-HATCH ADHESION TEST

| DISC SAMPLE TAPE SAMPLE | S1 3M[1] W/O IPA | | S2 3M W/O IPA | S1 NICHIBAN W/O IPA | S2 NICHIBAN W/O IPA |
|---|---|---|---|---|---|
| 5 | 98% | 98% | 97% | 100% | 100% |
| 6 | 99% | 100% | 100% | 100% | 100% |
| 7 | 100% | 100% | 99% | 100% | 100% |
| 8 | 98% | 99% | 100% | 100% | 100% |
| 9 | 100% | 100% | 100% | 100% | 100% |
| 10 | 100% | | 100% | 100% | 100% |
| 11 | 190% | | 100% | 100% | 100% |
| 12 | 100% | | 100% | 100% | 100% |

[1]Scotch Brand 2040
[2]Control

EXAMPLE 26

TABLE 26A

| Sample | TPO[1] | MAL-PP[2] | JEFFAMINE ® M-2070 | Phenol |
|---|---|---|---|---|
| 1 | 100% | — | — | — |
| 2 | 90% | 10% | — | — |
| 3 | 85% | 15% | — | — |
| 4 | 80% | 20% | — | — |
| 5 | 85.8% | 10% | 4% | 0.2% |
| 6 | 83.8% | 10% | 6% | 0.2% |
| 7 | 80.8% | 15% | 4% | 0.2% |
| 8 | 78.8% | 15% | 6% | 0.2% |
| 9 | 75.8% | 20% | 4% | 0.2% |
| 10 | 73.8% | 20% | 6% | 0.2% |
| 11 | 80.8% | 15% | 4% | 0.2% |
| 12 | 78.8% | 15% | 6% | 0.2% |
| 13 | 75.8% | 20% | 4% | 0.2% |
| 14 | 73.8% | 20% | 6% | 0.2% |

[1]KELTAN TP 2632
[2]EPOLENE E-43

TABLE 26B

| | 1 | 2 | 3 | 4 | 5 | 6 | 7 |
|---|---|---|---|---|---|---|---|
| Flexural Modulus, MPa | 1648 | 1838 | 1863 | 1895 | 1537 | 1314 | 1415 |
| Stress at Yield, MPa | 26.9 | 32.7 | 33.9 | 34.2 | 27.5 | 23.8 | 25.7 |
| Tensile Elongation, % | 93 | 6 | 4 | 2 | 9 | 9 | 6 |
| Tensile Strength, MPa | 15.9 | 18.7 | 19.0 | 18.9 | 17.0 | 15.4 | 15.9 |
| Young's Modulus, MPa | 876 | 1007 | 1065 | 1080 | 881 | 779 | 802 |
| Hardness, Shore D | 63 | 64 | 64 | 64 | 62 | 57 | 60 |
| Notched Izod Impact, J/m | 518 | 56 | 98 | 23 | 126 | 204 | 63 |
| −30° C., J/m | 146 | 36 | 24 | 14 | 27 | 32 | 19 |
| Unnotched Izod Impact, J/m | 1147 | 923 | 691 | 327 | 920 | 508 | 417 |
| Falling Dart Impact | | | | | | | |
| Max Load, J/m | 1496 | 1644 | 1628 | 1222 | 1408 | 1044 | 916 |
| −30° C., J/m | 2499 | 2662 | 2371 | 799 | 1040 | 597 | 566 |
| Total Energy, J | 22.0 | 21.1 | 20.1 | 9.72 | 16.7 | 10.1 | 8.45 |
| −30° C., J | 34.7 | 21.6 | 13.1 | 5.14 | 3.61 | 3.15 | 2.96 |
| Ductile/5 | 5 | 5 | 5 | 0 | 3 | 5 | 0 |
| −30° C./5 | 5 | 0 | 0 | 0 | 0 | 0 | 0 |

| | 8 | 9 | 10 | 11 | 12 | 13 | 14 |
|---|---|---|---|---|---|---|---|
| Flexural Modulus, MPa | 1285 | 1439 | 1261 | 1356 | 1173 | 1479 | 1323 |
| Stress at Yield, MPa | 22.8 | 25.8 | 22.6 | 27.6 | 26.1 | 28.7 | 27.0 |
| Tensile Elongation, % | 6 | 4 | 5 | 8 | 10 | 4 | 6 |
| Tensile Strength, MPa | 15.0 | 16.4 | 14.9 | 17.7 | 17.4 | 17.4 | 17.0 |
| Young's Modulus, MPa | 767 | 887 | 777 | 738 | 663 | 862 | 743 |
| Hardness, Shore D | 59 | 60 | 60 | 62 | 60 | 61 | 59 |
| Notched Izod Impact, J/m | 58 | 27 | 31 | 55 | 92 | 32 | 40 |
| −30° C., J/m | 16 | 13 | 12 | 22 | 22 | 15 | 18 |
| Unnotched Izod Impact, J/m | 313 | 334 | 222 | 691 | 812 | 632 | 771 |
| Falling Dart Impact | | | | | | | |
| Max Load, J/m | 719 | 492 | 334 | 1548 | 1555 | 929 | 1207 |
| −30° C., J/m | 518 | 487 | 472 | 1923 | 1161 | 616 | 812 |
| Total Energy, J | 5.92 | 4.02 | 2.71 | 18.9 | 19.0 | 7.08 | 10.8 |
| −30° C., J | 3.07 | 2.63 | 2.82 | 7.76 | 5.34 | 3.85 | 4.02 |
| Ductile/5 | 0 | 0 | 0 | 4 | 5 | 0 | 0 |
| −30° C./5 | 0 | 0 | 0 | 0 | 0 | 0 | 0 |

TABLE 26C

CROSS-HATCH ADHESION TEST

| DISC SAMPLE TAPE SAMPLE | S1 3M[1] W/IPA | S2 3M W/IPA | S1 NICHIBAN W/O IPA | S2 NICHIBAN W/O IPA |
|---|---|---|---|---|
| PP[2] | 0% | | 0% | |
| 1 | 77% | 84% | 65% | 92% |
| 2 | 32% | 0% | 22% | 5% |
| 3 | 1% | 4% | 8% | 8% |
| 4 | 0% | 0% | 7% | 13% |
| 5 | 100% | 100% | 99% | 96% |
| 6 | 100% | 100% | 100% | 100% |
| 7 | 100% | 100% | 95% | 82% |
| 8 | 100% | 100% | 88% | 100% |
| 9 | 99% | 98% | 100% | 100% |
| 10 | 100% | 100% | 100% | 100% |
| 11 | 100% | 96% | 100% | 93% |
| 12 | 74% | 19% | 57% | 77% |
| 13 | 83% | 62% | 100% | 64% |
| 14 | 91% | 84% | 91% | 93% |

[1]Scotch Brand 2040
[2]Control

EXAMPLE 27

TABLE 27A

| Sample | TPO[1] | MAL-PP[2] | AMINE[3] | Phenol | PP[4] |
|---|---|---|---|---|---|
| 1 | 99.7% | — | — | 0.3% | |
| 2 | 84.7% | — | — | 0.3% | 15% |
| 3 | 79.7% | — | — | 0.3% | 20% |
| 4 | 89.7% | 10% | — | 0.3% | |
| 5 | 84.7% | 10% | — | 0.3% | |
| 6 | 79.7% | 20% | — | 0.3% | |
| 7 | 85.7% | 10% | 4% | 0.3% | |
| 8 | 83.7% | 10% | 6% | 0.3% | |
| 9 | 80.7% | 15% | 4% | 0.3% | |
| 10 | 78.7% | 15% | 6% | 0.3% | |
| 11 | 75.7% | 20% | 4% | 0.3% | |
| 12 | 73.7% | 20% | 6% | 0.3% | |
| 13 | 71.7% | 20% | 8% | 0.3% | |

[1]HIMONT CA53A
[3]A polyether monoamine containing 40 ethylene oxide units and 2.4 propylene oxide units, generally of the formula shown in the Glossary for JEFFAMINE ® M-2070, which is referred to within Huntsman Corporation as "XTJ-418."
[4]AMOCO 1016
[2]EPOLENE E-43

TABLE 27B

| | 1 | 2 | 3 | 4 | 5 | 6 | 7 |
|---|---|---|---|---|---|---|---|
| Flexural Modulus, MPa | 510 | 646 | 705 | 588 | 664 | 734 | 546 |
| Stress at Yield, MPa | 15.8 | 19.8 | 21.4 | 18.7 | 20.6 | 22.7 | 17.2 |
| Tensile Elongation, % | 666 | 666 | 666 | 666 | 666 | 484 | 531 |
| Tensile Strength, MPa | 14.6 | 17.0 | 18.1 | 14.6 | 14.6 | 15.5 | 12.3 |
| Young's Modulus, MPa | 284 | 368 | 394 | 340 | 375 | 414 | 310 |
| Hardness, Shore D | 58 | 60 | 60 | 59 | 61 | 62 | 57 |
| Notched Izod Impact, J/m | 589 | 582 | 597 | 529 | 398 | 94 | 499 |
| −30° C., J/m | 65 | 47 | 38 | 38 | 37 | 37 | 40 |
| Unnotched Izod Impact, J/m | 722 | 867 | 841 | 727 | 882 | 958 | 704 |
| Falling Dart Impact | | | | | | | |
| Max Load, J/m | 1428 | 1589 | 1632 | 1486 | 1513 | 1529 | 1334 |
| −30° C., J/m | 3007 | 3335 | 3506 | 3290 | 3278 | 2610 | 889 |
| Total Energy, J | 20.6 | 22.6 | 23.4 | 20.9 | 20.6 | 21.1 | 16.0 |
| −30° C., J | 39.4 | 39.3 | 44.6 | 43.0 | 38.5 | 18.0 | 3.7 |
| Ductile/5 | 5 | 5 | 5 | 5 | 5 | 5 | 5 |
| −30° C./5 | 5 | 4 | 5 | 5 | 4 | 0 | 0 |

| | 8 | 9 | 10 | 11 | 12 | 13 |
|---|---|---|---|---|---|---|
| Flexural Modulus, MPa | 502 | 529 | 618 | 603 | 591 | 653 |
| Stress at Yield, MPa | 16.4 | 16.9 | 18.6 | 18.8 | 18.5 | 19.6 |
| Tensile Elongation, % | 208 | 245 | 170 | 138 | 37 | 43 |
| Tensile Strength, MPa | 11.7 | 12.2 | 13.0 | 13.5 | 13.5 | 13.8 |
| Young's Modulus, MPa | 299 | 309 | 355 | 348 | 354 | 381 |
| Hardness, Shore D | 52 | 58 | 57 | 52 | 57 | 59 |
| Notched Izod Impact, J/m | 443 | 437 | 445 | 310 | 162 | 90 |
| −30° C., J/m | 46 | 35 | 36 | 28 | 25 | 22 |
| Unnotched Izod Impact, J/m | 601 | 642 | 834 | 871 | 732 | 789 |
| Falling Dart Impact | | | | | | |
| Max Load, J/m | 1180 | 1255 | 1207 | 1263 | 1205 | 908 |
| −30° C., J/m | 760 | 2344 | 1505 | 1018 | 911 | 688 |
| Total Energy, J | 12.9 | 14.1 | 14.2 | 14.4 | 13.2 | 7.0 |
| −30° C., J | 3.2 | 12 | 6.3 | 3.3 | 3.1 | 3.1 |
| Ductile/5 | 5 | 5 | 5 | 5 | 5 | 0 |
| −30° C./5 | 0 | 0 | 0 | 0 | 0 | 0 |

TABLE 27C

CROSS-HATCH ADHESION TEST

| DISC SAMPLE TAPE SAMPLE | S1 3M[1] W/O IPA | S2 3M W/O IPA | S1 NICHIBAN W/O IPA | S2 NICHIBAN W/O IPA |
|---|---|---|---|---|
| PP[2] | 5% | | 2% | |
| 1 | 29% | 67% | 74% | 92% |
| 2 | 66% | 76% | 81% | 84% |
| 3 | 61% | 73% | 78% | 61% |
| 4 | 100% | 98% | 100% | 98% |
| 5 | 96% | 100% | 100% | 99% |
| 6 | 85% | 94% | 91% | 96% |
| 7 | 100% | 100% | 100% | 100% |
| 8 | 100% | 100% | 100% | 100% |
| 9 | 100% | 100% | 100% | 100% |
| 10 | 100% | 100% | 100% | 100% |
| 11 | 100% | 100% | 100% | 100% |
| 12 | 100% | 100% | 100% | 100% |
| 13 | 100% | 100% | 100% | 100% |

[1]Scotch Brand 2040
[2]Control

Examples 18–27 demonstrate that TPO modified with the reaction product of maleated PP and polyether amines of this invention provides a composition that is directly paintable. This paintability is surprising and unexpected in that the TPO's used to make automotive body parts, such as bumper fascias, are not directly readily paintable to a commercially acceptable level. Heretofore, in order to render automotive TPO based molded body parts paintable, the parts were treated with an adhesion promoter comprised of low molecular weight chlorinated polyethylene and a solvent, which results in a toxic waste stream that must be properly disposed of, and which adds to the cost of the parts. Alternatively, the parts could be heat treated using plasma irradiation, or otherwise partially burning the surface of the parts. This procedure is also expensive and may be, moreover, prone to variability in result owing to batch to batch variances from procedure and errors by the operator.

Compositions prepared in accordance with the practice of the present invention generally may be directly painted, with or without a primer, such that the paint adhesion is greater than about 75 percent based on the testing procedure described above for Examples 18–27, preferably greater than about 85 percent, more preferably greater than about 90 percent, and most preferably greater than about 95 percent.

Compositions prepared in accordance with the present invention may be used to prepare molded articles of manufacture using conventional, well known, molding techniques under standard conditions. For instance, standard injection molding techniques can be employed. Certain compositions (blends) of the present invention have surprisingly been found to have improved flowability characteristics during injection molding of TPO-based compositions such that less pressure may be used when injecting the melted compositions into a mold, as compared to compositions in which polyetheramine is absent. The desired shape of the molded article may vary depending on end use of the article. For instance, rubber containing compositions of the present invention may be injection molded to manufacture automotive body parts such as bumper fascias.

In the following Examples 28–29, there are shown modified TPV-based (thermoplastic polyolefin vulcanizate-based) compositions that include polyether amines of the present invention (Tables 28A and 29A), and the physical properties of the compositions (Tables 28B and 29B, including paint adhesion). In Examples 28-29, and Tables 28A, 28B, 29A, and 29B, the TPV employed was SANTOPRENE 101-87, available from Advance Elastomer Systems. SANTOPRENE 101-87 is believed to contain PP and dynamically vulcanized rubber. In Example 28, the amine employed was the same polyether amine used in Table 27A as described in footnote 3.

TABLE 28A

| Sample | TPV | EPOLENE E-43 | AMINE | EHTANOX 330 |
|---|---|---|---|---|
| 1 | 100% | — | — | — |
| 2 | 89.8% | 10% | — | 0.2% |
| 3 | 85.8% | 10% | 4% | 0.2% |
| 4 | 83.8% | 10% | 6% | 0.2% |
| 5 | 80.8% | 15% | 4% | 0.2% |
| 6 | 78.8% | 15% | 6% | 0.2% |
| 7 | 75.8% | 20% | 4% | 0.2% |
| 8 | 73.8% | 20% | 6% | 0.2% |
| 9 | 71.8% | 20% | 8% | 0.2% |

EXAMPLE 28

TABLE 28B

|  | 1 | 2 | 3 | 4 | 5 | 6 | 7 | 8 | 9 |
|---|---|---|---|---|---|---|---|---|---|
| Flexural Modulus, MPa | 196 | 294 | 252 | 272 | 282 | 316 | 321 | 345 | 366 |
| Stress at Yield, MPa | 7.1 | 9.5 | 8.5 | 8.8 | 9.1 | 9.8 | 10.2 | 10.8 | 10.8 |
| Tensile Elongation, % | 666 | 666 | 666 | 666 | 644 | 666 | 479 | 467 | 118 |
| Tensile Strength, MPa | 12.0 | 12.3 | 11.6 | 11.6 | 11.4 | 11.4 | 10.4 | 10.4 | 7.9 |
| Hardness Shore D | 41 | 45 | 43 | 44 | 45 | 47 | 47 | 48 | 49 |
| Notched Izod Impact, J/m | 268 | 388 | 380 | 357 | 402 | 377 | 354 | 198 | 120 |
| −30° C., J/m | 606 | 114 | 103 | 81 | 58 | 49 | 25 | 30 | 19 |
| Falling Dart Impact |  |  |  |  |  |  |  |  |  |
| Max Load, J/m | 824 | 915 | 854 | 836 | 870 | 865 | 878 | 892 | 813 |
| −30° C., J/m | 1529 | 1749 | 1827 | 1655 | 1570 | 1597 | 1042 | 1194 | 782 |
| Total E, J | 19.4 | 20.2 | 18.9 | 18.5 | 17.7 | 18.4 | 15.5 | 16.2 | 8.7 |
| −30° C., J | 26.2 | 25.9 | 22.0 | 20.6 | 9.0 | 11.1 | 4.5 | 5.8 | 3.0 |
| Ductile/5 | 5 | 5 | 5 | 5 | 5 | 5 | 5 | 5 | 5 |
| −30° C., J | 5 | 5 | 5 | 5 | 0 | 0 | 0 | 0 | 0 |
| MFI, gm/10 min. | 0.3 | 4.0 | 5.1 | 23 | 40 | 47 | 63 | 90 | 154 |
| Paint Adhesion w/IPA, % | 30 | 49 | 72 | 100 | 72 | 92 | 92 | 96 | 100 |
| w/o IPA, % | 46 | 23 | 70 | 100 | 66 | 72 | 69 | 78 | 100 |

EXAMPLE 29

TABLE 29A

| Sample | TPV | EPOLENE E-43 | JEFFAMINE ® M-2070 | ETHANOX 330 |
|---|---|---|---|---|
| 1 | 100% | — | — | — |
| 2 | 89.8% | 10% | — | 0.2% |
| 3 | 84.8% | 15% | — | 0.2% |
| 4 | 79.8% | 20% | — | 0.2% |
| 5 | 85.8% | 10% | 4% | 0.2% |
| 6 | 83.8% | 10% | 6% | 0.2% |
| 7 | 80.8% | 15% | 4% | 0.2% |
| 8 | 78.8% | 15% | 6% | 0.2% |
| 9 | 75.8% | 20% | 4% | 0.2% |
| 10 | 73.8% | 20% | 6% | 0.2% |
| 11 | 71.8% | 20% | 8% | 0.2% |
| | | | JEFFAMINE ® ED-2003 | |
| 12 | 80.8% | 15% | 4% | 0.2% |
| 13 | 78.8% | 15% | 6% | 0.2% |
| 14 | 75.8% | 20% | 4% | 0.2% |
| 15 | 73.8% | 20% | 6% | 0.2% |
| 16 | 71.8% | 20% | 8% | 0.2% |

Examples 28–29 demonstrate the improved properties of TPV-based compositions that have been modified with the reaction product of maleated PP and polyether amines, providing composition that are directly paintable. This paintability is surprising and unexpected in that TPV's used to make automotive parts, are not directly readily paintable to a commercially acceptable level. Instead, TPV-based compositions had to be treated, as described above for TPO-based compositions.

TPV-based compositions prepared in accordance with the practice of this invention generally may be directly painted, with or without primer, such that the paint adhesion is greater than about 75 percent based on the testing procedure used for Examples 28–29, preferably greater than about 85 percent, more preferably greater than about 90 percent, and most preferably greater than about 95 percent.

Performance improvements can be gained by incorporating polyetheramines into polyolefins such as polypropylene, polyethylene and copolymers of ethylene, propylene, alpha-olefins, and mixtures thereof, as well as polyolefins containing conjugated and unconjugated dienes, for textile and nonwoven applications. Polyetheramines can be incorporated into polyolefins by reacting the polyetheramine with a

TABLE 29B

|  | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| Flexural Modulus, MPa | 208 | 290 | 368 | 417 | 273 | 251 | 282 | 272 | 329 | 310 | 313 | 263 | 227 | 292 | 295 | 280 |
| Stress at Yield, MPa | 7.3 | 9.5 | 11.5 | 12.6 | 9.0 | 8.6 | 9.3 | 8.9 | 10.4 | 9.8 | 9.9 | 8.9 | 8.1 | 9.5 | 9.9 | 9.7 |
| Tensile Elongation, % | 666 | 666 | 658 | 545 | 666 | 666 | 666 | 663 | 561 | 580 | 379 | 666 | 666 | 666 | 666 | 666 |
| Tensile Strength, MPa | 12.3 | 12.9 | 12.7 | 11.6 | 11.7 | 11.5 | 12.3 | 11.5 | 11.1 | 10.6 | 9.8 | 11.8 | 12.2 | 11.8 | 11.3 | 11.4 |
| Hardness, Shore D | 41 | 46 | 49 | 51 | 44 | 43 | 45 | 44 | 47 | 46 | 47 | 46 | 44 | 46 | 47 | 46 |
| Notched Izod Impact, J/m | 353 | 400 | 438 | 393 | 378 | 381 | 379 | 403 | 250 | 321 | 150 | 404 | 378 | 423 | 373 | 380 |
| −30° C., J/m | 655 | 153 | 46 | 24 | 70 | 12 | 71 | 48 | 15 | 25 | 23 | 44 | 58 | 24 | 24 | 27 |
| Maximum Load, J/m | 973 | 906 | 961 | 966 | 895 | 889 | 894 | 832 | 881 | 854 | 850 | 906 | 922 | 921 | 895 | 935 |
| −30° C., J/m | 1741 | 1658 | 1817 | 1538 | 1857 | 1731 | 1909 | 1865 | 854 | 1100 | 796 | 2068 | 1662 | 689 | 387 | 574 |
| Total Energy, J | 21.0 | 21.0 | 20.2 | 17.5 | 19.8 | 19.2 | 19.0 | 17.7 | 15.8 | 16.6 | 15.3 | 19.3 | 18.9 | 18.5 | 15.4 | 19.1 |
| −30° C. | 26.6 | 28.3 | 20.2 | 7.4 | 23.8 | 21.1 | 21.1 | 13.9 | 4.4 | 5.1 | 4.0 | 15.0 | 7.4 | 2.1 | 2.5 | 1.3 |
| Ductile/5 | 5 | 5 | 5 | 5 | 5 | 5 | 5 | 5 | 5 | 5 | 5 | 5 | 5 | 5 | 5 | 5 |
| −30° C. | 5 | 5 | 4 | 0 | 4 | 4 | 5 | 0 | 0 | 0 | 0 | 0 | 0 | 0 | 0 | 0 |
| MFI, gm/10 min. | 0.6 | 0.8 | 8.1 | 14 | 4.3 | 19 |  | 44 | 74 | 111 | 95 | 11 | 0.9 | 24 | 19 | 3.8 |
| Paint Adhesion w/IPA, % | 4 | 0 | 14 | 4 | 16 | 35 | 14 | 72 | 80 | 98 | 96 | 2 | 1 | 32 | 92 | 70 |
| w/o IPA, % | 1 | 1 | 20 | 8 | 14 | 16 | 6 | 78 | 98 | 92 | 92 | 10 | 1 | 36 | 91 | 62 | functionalized polyolefin. One example of such technology is the reaction of polyetheramine with maleated polypropylene in the presence of polypropylene. Such a reaction can be completed in an extruder or similar thermoplastic mixing device. An adduct of the reaction product of the maleated polypropylene/polyether amine can be produced in a reactor and then subsequently added to polypropylene or polyolefin for further processing.

The incorporation of polyetheramines into polyolefins will improve the dyeability of the polyolefin. The polar polyether segment is a site for the complexation of polar solvent or water based dyes. Typical polar dyes are not compatible with nonpolar polyolefins and would quickly bleed out of the fiber or filament.

The polyetheramines will improve the washability of a polyolefin based textile fabric or nonwoven mat. The nonpolar polyolefin tends to hold on to dirt due to the hydrophobic nature of both. The polyetheramine will allow detergents to penetrate the fabric or matrix so the detergents can loosen and wash away the dirt and oils.

The incorporation of polyether amines will increase the adsorption and wickability of polyolefin textiles and nonwovens. One example is the melt blown, nonwoven absorbent in baby diapers. Making the surface of the nonwoven filament more hydrophilic by incorporating the polar polyetheramine into the polyolefin will greatly increase the diaper's moisture absorption characteristics.

Suitable thermoplastic resin compositions useful in the manufacture of fibers and nonwovens should contain an effective amount of polyetheramine. In one embodiment of the present invention, the thermoplastic resin composition may contain up to about 12 wt % polyetheramine and up to about 30 wt % maleated polypropylene. In particular, the thermoplastic resin composition may contain up to 8 wt % polyetheramine and up to 20 wt % maleated polypropylene. In a preferred embodiment, the thermoplastic resin composition may contain from about 0.1 to about 5 wt % polyetheramine and from about 0.2 to about 15 wt % maleated polypropylene. In an especially preferred embodiment, the thermoplastic resin composition may contain from about 1 to about 4 wt % polyetheramine and from about 2 to about 12 wt % maleated polypropylene.

Applications of the fibers and filaments from the polyether modified polyolefins include, with limitation: woven garments (outerwear and underwear); carpet; furniture and automobile upholstery; nonwoven absorbents used in diapers, sanitary pads, incontinence pads, spill abatement, and medical absorbent pads; nonwoven garments, including disposable medical garments; felts; pressed sheets; geotextiles; filters (bipolar); and packaging materials, including envelopes.

EXAMPLES 30–45

In Examples 30–45, polyolefins, maleated polypropylene, and polyetheramine are compounded to produce a polyolefin blend that is used to produce polyolefin fibers having improved and unexpected results. Table 1 shows the amount and type of poleolefin and the amounts of poletheramine and maleated polypropylene which is compounded:

TABLE 1

| Run | Polyolefin Type | Polyolefin wt % | Polyetheramine wt % | Maleated PP wt % |
|---|---|---|---|---|
| 1 | PP | 98.7 | 0.5 | 0.8 |
| 2 | PP | 97.5 | 1 | 1.5 |

TABLE 1-continued

| Run | Polyolefin Type | Polyolefin wt % | Polyetheramine wt % | Maleated PP wt % |
|---|---|---|---|---|
| 3 | PP | 96.2 | 1.5 | 2.3 |
| 4 | PP | 95 | 2 | 3 |
| 5 | PP | 93.7 | 2.5 | 3.8 |
| 6 | PP | 92.5 | 3 | 4.5 |
| 7 | PP | 91.2 | 3.5 | 5.3 |
| 8 | PP | 90 | 4 | 6 |
| 9 | PP | 88.7 | 4.5 | 6.8 |
| 10 | PP | 87.5 | 5 | 7.5 |
| 11 | PP | 85 | 6 | 9 |
| 12 | PP | 82.5 | 7 | 10.5 |
| 13 | PP | 80 | 8 | 12 |
| 14 | PE | 98.7 | 0.5 | 0.8 |
| 15 | PE | 97.5 | 1 | 1.5 |
| 16 | PE | 96.2 | 1.5 | 2.3 |
| 17 | PE | 95 | 2 | 3 |
| 18 | PE | 93.7 | 2.5 | 3.8 |
| 19 | PE | 92.5 | 3 | 4.5 |
| 20 | PE | 91.2 | 3.5 | 5.3 |
| 21 | PE | 90 | 4 | 6 |
| 22 | PE | 88.7 | 4.5 | 6.8 |
| 23 | PE | 87.5 | 5 | 7.5 |
| 24 | PE | 85 | 6 | 9 |
| 25 | PE | 82.5 | 7 | 10.5 |
| 26 | PE | 80 | 8 | 12 |

GLOSSARY

JEFFAMINE M-1000

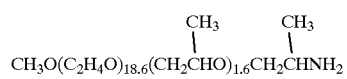

$$CH_3O(C_2H_4O)_{18.6}(CH_2CHO)_{1.6}CH_2CHNH_2$$
with CH$_3$ branches

JEFFAMINE M-2070 and JEFFAMINE M-2005

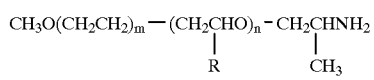

$$CH_3O(CH_2CH_2)_m-(CH_2CHO)_n-CH_2CHNH_2$$
with R and CH$_3$ branches where R=H or CH$_3$, m is from about 3 to 32, and n is from about 10 to 32.

JEFFAMINE D-2000. JEFFAMINE D-4000 and JEFFAMINE D-400

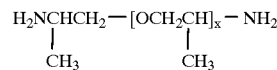

$$H_2NCHCH_2-[OCH_2CH]_x-NH_2$$
with CH$_3$ branches where x is about 33 for D-2000, x is about 68 for D4000 and x is about 5.6 for D400.

JEFFAMINE ED-600. JEFFAMINE ED-900. JEFFAMINE ED-2001. JEFFAMINE ED-4000, and JEFFAMINE ED-6000

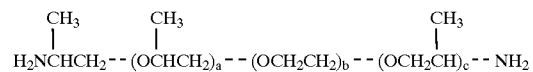

$$H_2NCHCH_2--(OCHCH_2)_a--(OCH_2CH_2)_b--(OCH_2CH)_c--NH_2$$
with CH$_3$ branches where b is about 8.5 and a+c is about 2.5 for ED-600, b is about 15.5 and a+c is about 2.5 for ED-900, b is about 40.5 and a+c is about 2.5 for ED-2001, b is about 86.0 and a+c is about 2.5 for ED4000, and b is about 132.0 and a+c is about 3.0 for ED-6000.

JEFFAMINE T-3000 and JEFFAMINE T-5000

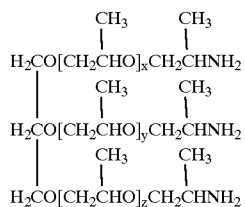

where x+y+z=50 for T-3000 and x+y+z=83 for T-5000.
JEFFAMINE ET-3000

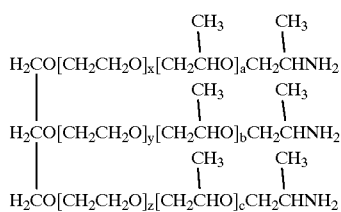

where x+y+z=57 and a+b+c=4.

We claim:

1. A composition comprising polypropylene, a polyolefin vulcanizate, and the reaction product of a functionalized polypropylene and a polyether amine.

2. The compound of claim 1, wherein the functionalized polypropylene is derived from the free radical reaction of polypropylene and an olefinically unsaturated carboxylic acid.

3. The compound of claim 2 wherein the olefinically unsaturated carboxylic acid is a monocarboxylic acid derived from acrylic acid or methacrylic acid, and the corresponding esters.

4. The compound of claim 2 wherein the olefinically unsaturated carboxylic acid is a dicarboxylic acid derived from fumaric acid, maleic acid, and itaconic acid.

5. The compound of claim 1 wherein the functionalized polypropylene is derived from the reaction of polypropylene and mono- and/or di- esters of olefinically unsaturated dicarboxylic acids wherein the olefinically unsaturated dicarboxylic acids are derived from mono-fumarate, di-fumarate, mono-maleate, or di-maleate.

6. The compound of claim 1 wherein the functionalized polypropylene is derived from the reaction of polypropylene and an olefinically unsaturated carboxylic anhydride.

7. The compound of claim 1 wherein the functionalized polypropylene is derived from the reaction of polypropylene and sulfo- or sulfonyl-containing olefinically unsaturated monomers wherein the olefinically unsaturated monomers are derived from p-styrenesulfonic acid, 2-(meth)acrylamide-2-methylpropenesulfonic acid or 2-sulfonyl-(meth)acrylate.

8. The compound of claim 1 wherein the functionalized polypropylene is derived from the reaction of polypropylene and oxazolinyl-containing olefinically unsaturated monomers comprising vinyloxazolines and vinyloxazoline derivatives.

9. The compound of claim 1 wherein the functionalized polypropylene is derived from the reaction of polypropylene and epoxy-containing olefinically unsaturated monomers, selected from the group consisting of glycidyl (meth) acrylate and allyl glycidyl ether.

10. The compound of claim 1 wherein the polyether amine is selected from the group consisting of monoamines, diamines and triamines and has a molecular weight of from about 148 to 12,000.

11. The composition according to claim 10, wherein the polyetheramine is a monoamine or diamine and having a molecular weight of from about 150 to about 12,000.

12. The composition according to claim 1, wherein the polyetheramine is prepared from ethylene oxide and propylene oxide with the amount of ethylene oxide in the polyetheramine being greater than about 50 percent.

13. The composition according to claim 1, wherein the composition comprises from about 5 to about 40 weight percent functionalized polypropylene, from about 2 to about 10 weight percent of polyether amine, and 50 to about 93 weight percent of polypropylene and elastomer.

14. A composition useful as a material for making paintable automotive body parts, comprising:

polypropylene;

polyolefin vulcanizate; and the reaction product of maleated polypropylene and a polyether amine.

15. The compound of claim 14 wherein the reaction product of maleated polypropylene and the polyether amine has the formula:

[structure]

wherein a is from about 5 to 50,000, for b:c from about 0:100 to 100:0, x is from about 1 to 3, and R is an alkyl moiety.

16. The compound of claim 14 wherein the maleated polypropylene is selected from the group consisting of the structures having the formulae wherein PP is polypropylene:

[structures]

17. The compound of claim 14 wherein the polyether is selected from the group consisting of polyethylene glycol, polypropylene glycol and copolymers of polyethylene glycol and polypropylene glycol.

18. The compound of claim 14 wherein the polyetheramine has the following structure:

$$CH_3O(CH_2CH_2O)_m-(CH_2CHO)_n-CH_2CHNH_2$$
$$\hspace{4cm} R \hspace{1cm} CH_3$$

where R=H, CH$_3$, m is from about 3 to 32, and n is from about 10 to 32.

19. The compound of claim 14 wherein the polyetheramine has the following structures:

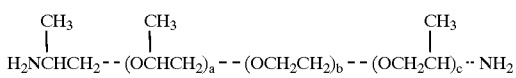

where b is about 40.5 and a+c is about 2.5, b is about 86.0 and a+c is about 2.5, and b is about 132.0 and a+c is about 2 to 10.

20. The compound of claim 14 wherein the polyetheramine has the following formula:

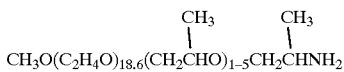

21. The compound of claim 14 wherein the polyether amine is selected from the group consisting of monoamines, diamines and triamines and has a molecular weight of from about 148 to 12,000.

22. The compound of claim 21 wherein the polyether amine is a monoamine selected from the group having a molecular weight from about 200 to 4000.

23. The compound of claim 22 wherein the monoamine has the following structure:

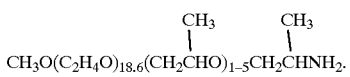

24. The compound of claim 22 wherein the monoamine has the following structure:

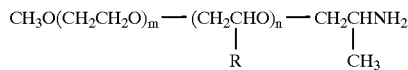

where R=H or CH, m is from about 3 to 32, and n is from about 10 to 32.

25. The compound of claim 21 wherein the polyether amine is a diamine selected from the group having a molecular weight of from about 148 to 6000.

26. The compound of claim 25 wherein the diamine is selected from the group consisting of compounds of the following structure:

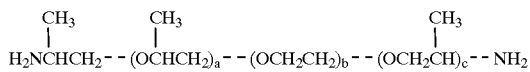

where b is about 8.5 and a+c is about 2.5, b is about 15.5 and a+c is about 2.5, b is about 40.5 and a+c is about 2.5, b is about 86.0 and a+c is about 2.5, and b is about 132.0 and a+c is about 2 to 10.

27. The compound of claim 21 wherein the diamine is selected from the group consisting of compounds of the following structure:

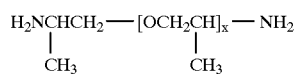

where x is about 33, x is about 68, and x is about 5.6.

28. The compound of claim 21 wherein the polyether amine is a triamine having the molecular weight of from about 200 to 4000.

29. The compound of claim 28 wherein the triamine is selected from the group consisting of compounds having the following structure:

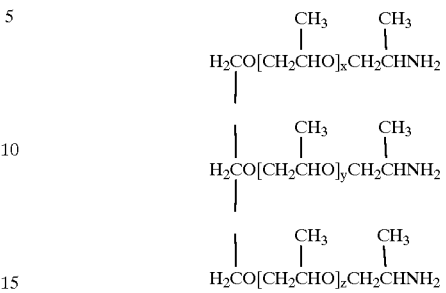

where x+y+z=50 and x+y+z=83.

30. The compound of claim 28 wherein the triamine has the following structure:

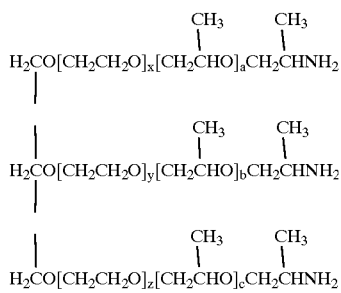

where x+y+z=57 and a+b+c=3 to 15.

31. The composition according to claim 14, wherein the maleated polypropylene has a number average molecular weight of about 3,000 to about 20,000.

32. The composition according to claim 14, wherein the polyetheramine has a molecular weight in the range from about 1,500 to about 2,000 and is a monoamine or a diamine.

33. The composition according to claim 14, wherein the polyetheramine is prepared from ethylene oxide and propylene oxide with the amount of ethylene oxide in the polyetheramine being greater than about 50 percent.

34. The composition according to claim 32, wherein the polyetheramine is a monoamine and wherein the polyetheramine is prepared from ethylene oxide and propylene oxide wherein the amount of ethylene oxide in the polyetheramine on a molar basis is greater than about 75 percent.

35. The composition according to claim 34, wherein the amount of ethylene oxide is greater than about 90 percent.

36. The composition according to claim 14, wherein the maleated polypropylene has a number average molecular weight of from about 3,000 to about 20,000.

37. The composition according to claim 14, wherein the composition comprises maleated polypropylene in an amount in the range from about 5 to about 40 weight percent and polyetheramine in an amount in the range from about 2 to about 10 weight percent.

38. The composition according to claim 14, wherein the polyetheramine is a monoamine or diamine having a molecular weight in the range from about 1,000 to about 3,000 and wherein the polyetheramine is prepared from propylene oxide, ethylene oxide or combination thereof.

39. The composition according to claim 14, wherein the polyetheramine is prepared from ethylene oxide, propylene oxide or combination thereof.

40. The composition according to claim 14, in the absence of an amine other than a polyetheramine and in the absence of a copolymer of an olefin and maleic anhydride.

41. The composition according to claim 14, wherein the paint adhesion of the composition is greater than 95 percent.

42. The composition according to claim 14, further comprising a glass filler in an amount up to about 40 weight percent.

43. A process for preparing a composition useful for making molded automotive body parts, comprising: feeding polypropylene, crosslinked thermoplastic polyolefin, maleated polypropylene, and polyether amine to a mixing apparatus at a temperature in the range from about 175° C. to about 300° C. under conditions such that a reaction product of the maleated polypropylene and the polyether amine is formed.

44. The process of claim 43 wherein the reaction product of maleated polypropylene and the polyether amine has the formula:

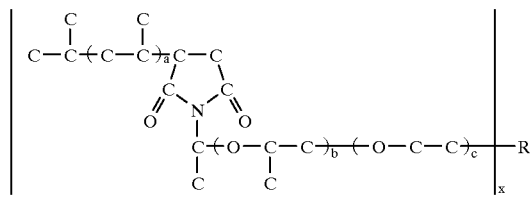

wherein a is from about 5 to 50,000, for b:c from about 0:100 to 100:0, x is from about 1 to 3, and R is an alkyl moiety.

45. The process of claim 43 wherein the maleated polypropylene is selected from the group consisting of the structures having the formulae wherein PP is polypropylene:

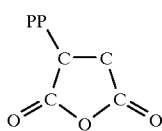 and 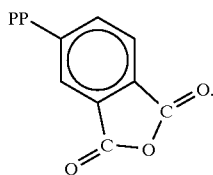

46. The process of claim 43 wherein the polyether is selected from the group consisting of polyethylene glycol, polypropylene glycol and copolymers of polyethylene glycol and polypropylene glycol.

47. The process of claim 43 wherein the polyetheramine has the following structure:

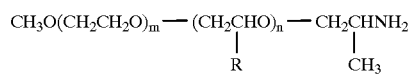

where R=H, $CH_3$, m is from about 3 to 32, and n is from about 10 to 32.

48. The process of claim 43 wherein the polyetheramine has the following structures:

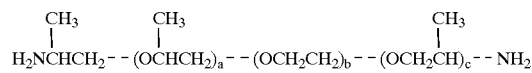

where b is about 40.5 and a+c is about 2.5, b is about 86.0 and a+c is about 2.5, and b is about 132.0 and a+c is about 2 to 10.

49. The process of claim 43 wherein the polyetheramine has the following formula:

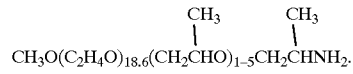

50. The process of claim 43 wherein the polyether amine is selected from the group consisting of monoamines, diamines and triamines and has a molecular weight of from about 148 to 12,000.

51. The process of claim 50 wherein the polyether amine is a monoamine selected from the group having a molecular weight from about 200 to 4000.

52. The process of claim 51 wherein the monoamine has the following structure:

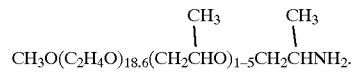

53. The process of claim 51 wherein the monoamine has the following structure:

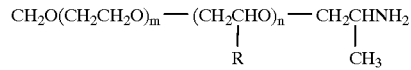

where R=H or CH, m is from about 3 to 32, and n is from about 10 to 32.

54. The process of claim 50 wherein the polyether amine is a diamine selected from the group having a molecular weight of from about 148 to 6000.

55. The process of claim 54 wherein the diamine is selected from the group consisting of compounds of the following structure:

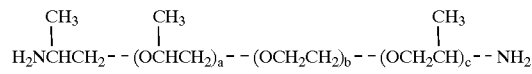

where b is about 8.5 and a+c is about 2.5, b is about 15.5 and a+c is about 2.5, b is about 40.5 and a+c is about 2.5, b is about 86.0 and a+c is about 2.5, and b is about 132.0 and a+c is about 2 to 10.

56. The process of claim 50 wherein the diamine is selected from the group consisting of compounds of the following structure:

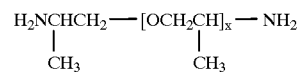

where x is about 33, x is about 68, and x is about 5.6.

57. The process of claim 50 wherein the polyether amine is a triamine having the molecular weight of from about 200 to 4000.

58. The process of claim 57 wherein the triamine is selected from the group consisting of compounds having the following structure:

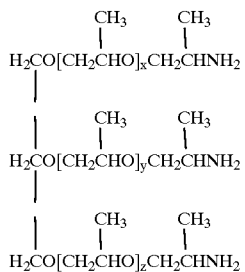

where x+y+z=50 and x+y+z=83.

59. The process of claim 57 wherein the triamine has the following structure:

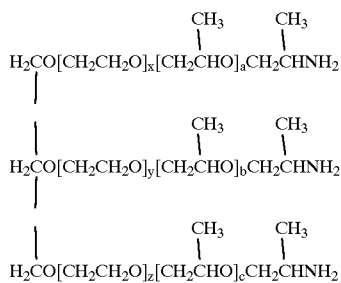

where x+y+z=57 and a+b+c=3 to 15.

60. The process according to claim 43, wherein the maleated polypropylene has a number average molecular weight of about 3,000 to about 20,000.

61. The process according to claim 43, wherein the polyetheramine has a molecular weight in the range from about 1,500 to about 2,000 and is a monoamine or a diamine.

62. The process according to claim 43, wherein the polyetheramine is prepared from ethylene oxide and propylene oxide with the amount of ethylene oxide in the polyetheramine being greater than about 50 percent.

63. The process according to claim 61, wherein the polyetheramine is a monoamine and wherein the polyetheramine is prepared from ethylene oxide and propylene oxide wherein the amount of ethylene oxide in the polyetheramine on a molar basis is greater than about 75 percent.

64. The process according to claim 63, wherein the amount of ethylene oxide is greater than about 90 percent.

65. The process according to claim 43, wherein the maleated polypropylene has a number average molecular weight of from about 3,000 to about 20,000.

66. The process according to claim 43, wherein the composition comprises maleated polypropylene in an amount in the range from about 5 to about 40 weight percent and polyetheramine in an amount in the range from about 2 to about 10 weight percent.

67. The process according to claim 43, wherein the polyetheramine is a monoamine or diamine having a molecular weight in the range from about 1,000 to about 3,000 and wherein the polyetheramine is prepared from propylene oxide, ethylene oxide or combination thereof.

68. The process according to claim 43, wherein the polyetheramine is prepared from ethylene oxide, propylene oxide or combination thereof.

69. The process according to claim 43, in the absence of an amine other than a polyetheramine and in the absence of a copolymer of an olefin and maleic anhydride.

70. The process according to claim 43, wherein the paint adhesion of the composition is greater than 95 percent.

71. The process according to claim 43, further comprising a glass filler in an amount up to about 40 weight percent.

72. The process of claim 43, further comprising preparing a molded automotive body part by injection molding a blend made in accordance with the feeding step; and painting the molded automotive body part.

73. An article of manufacture made in accordance with claim 72.

* * * * *